(12) United States Patent
Fukui

(10) Patent No.: US 8,682,880 B2
(45) Date of Patent: Mar. 25, 2014

(54) LOCATION AND KEYWORD BASED INFORMATION PROVIDING APPARATUS, METHOD, AND MEMORY MEDIUM

(75) Inventor: Masayuki Fukui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 323 days.

(21) Appl. No.: 12/883,211

(22) Filed: Sep. 16, 2010

(65) Prior Publication Data

US 2011/0066625 A1    Mar. 17, 2011

(30) Foreign Application Priority Data

Sep. 17, 2009    (JP) .................................. 2009-216041

(51) Int. Cl.
*G06F 17/30* (2006.01)

(52) U.S. Cl.
USPC .......................................... 707/706; 707/918

(58) Field of Classification Search
USPC ........... 707/706, 729, 918–921; 701/425–426
See application file for complete search history.

(56) References Cited

U.S. PATENT DOCUMENTS

| | | | |
|---|---|---|---|
| 6,487,495 B1 * | 11/2002 | Gale et al. ..................... | 701/461 |
| 7,203,597 B2 | 4/2007 | Sato et al. | |
| 7,783,419 B2 | 8/2010 | Taniguchi et al. | |
| 2006/0184313 A1 * | 8/2006 | Butler, Jr. ..................... | 701/200 |
| 2008/0098090 A1 * | 4/2008 | Geraci et al. .................. | 709/219 |
| 2009/0044623 A1 | 2/2009 | Matsumoto et al. | |
| 2011/0202514 A1 * | 8/2011 | Singh ............................ | 707/706 |

FOREIGN PATENT DOCUMENTS

| | | |
|---|---|---|
| JP | 2000-76280 A | 3/2000 |
| JP | 2001-236368 A | 8/2001 |
| JP | 2002-312381 A | 10/2002 |
| JP | 2003-303148 | 10/2003 |
| JP | 2006-24196 A | 1/2006 |
| JP | 2007-114942 | 5/2007 |
| JP | 2007-149036 A | 6/2007 |
| JP | 2007-264766 A | 10/2007 |
| JP | 2008-217133 A | 9/2008 |
| JP | 2009-048369 | 3/2009 |
| WO | WO-2003/038377 A | 5/2003 |

OTHER PUBLICATIONS

Japanese Office Action mailed Jul. 23, 2013 for corresponding Japanese Application No. 2009-216041, with Partial English-language Translation.

* cited by examiner

*Primary Examiner* — Thu-Nguyet Le
(74) *Attorney, Agent, or Firm* — Fujitsu Patent Center

(57) ABSTRACT

An information providing apparatus includes: a communication unit to receive transmitted information containing first location information associated with a first communication apparatus; a registering unit to extract, from the transmitted information, one or more keywords and the first location information, and to register the first location information and the one or more keywords in a keyword database; a request interface to receive a request for information from a second communication apparatus and a second location information associated with the second communication apparatus; an extractor to reference the keyword database and to extract one or more keywords based on the second location information; and a search requesting unit to output a search request containing the one or more keywords extracted by the extractor, wherein the search request is output to another computer that executes a search to provide information to the second communication apparatus.

20 Claims, 25 Drawing Sheets

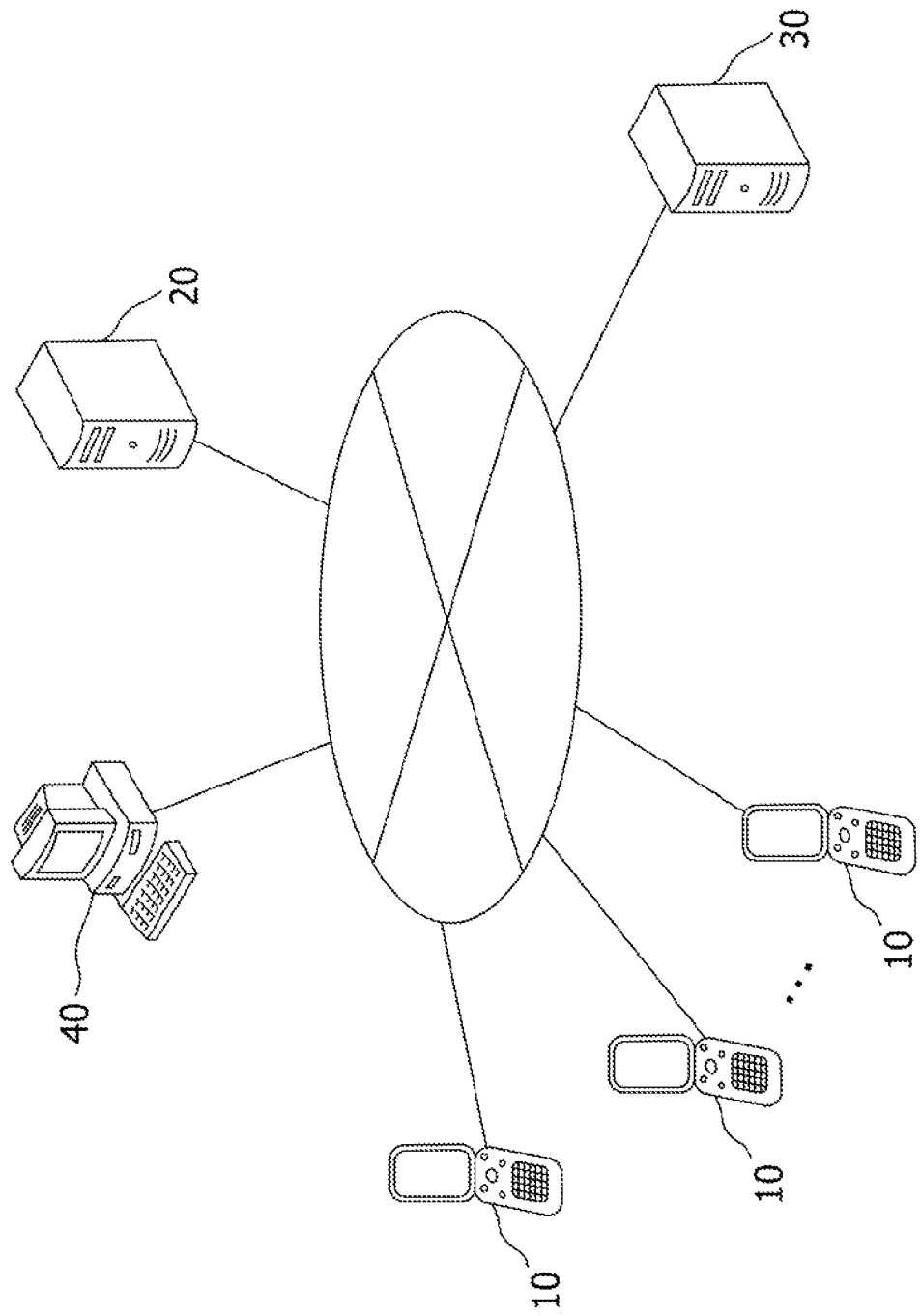

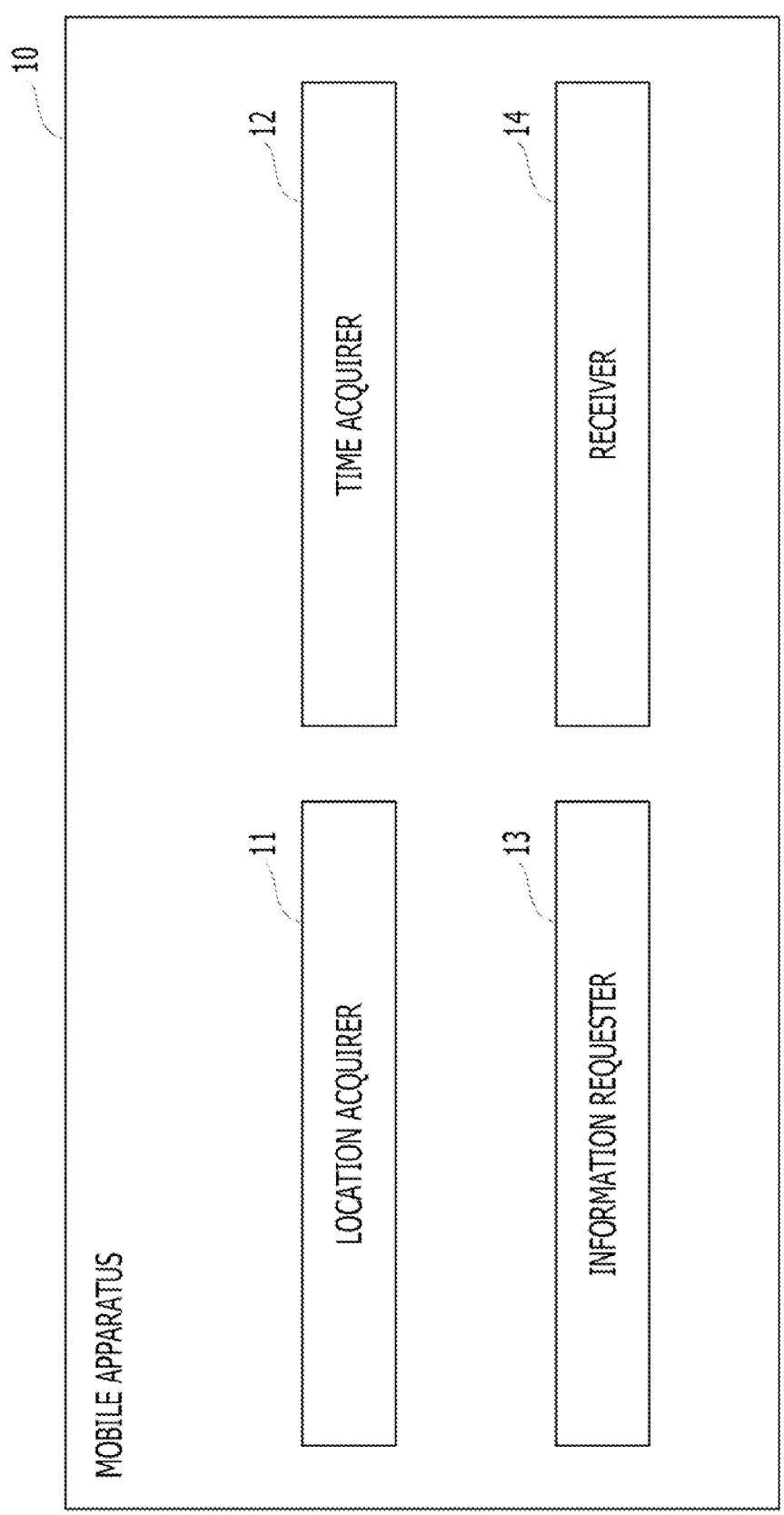

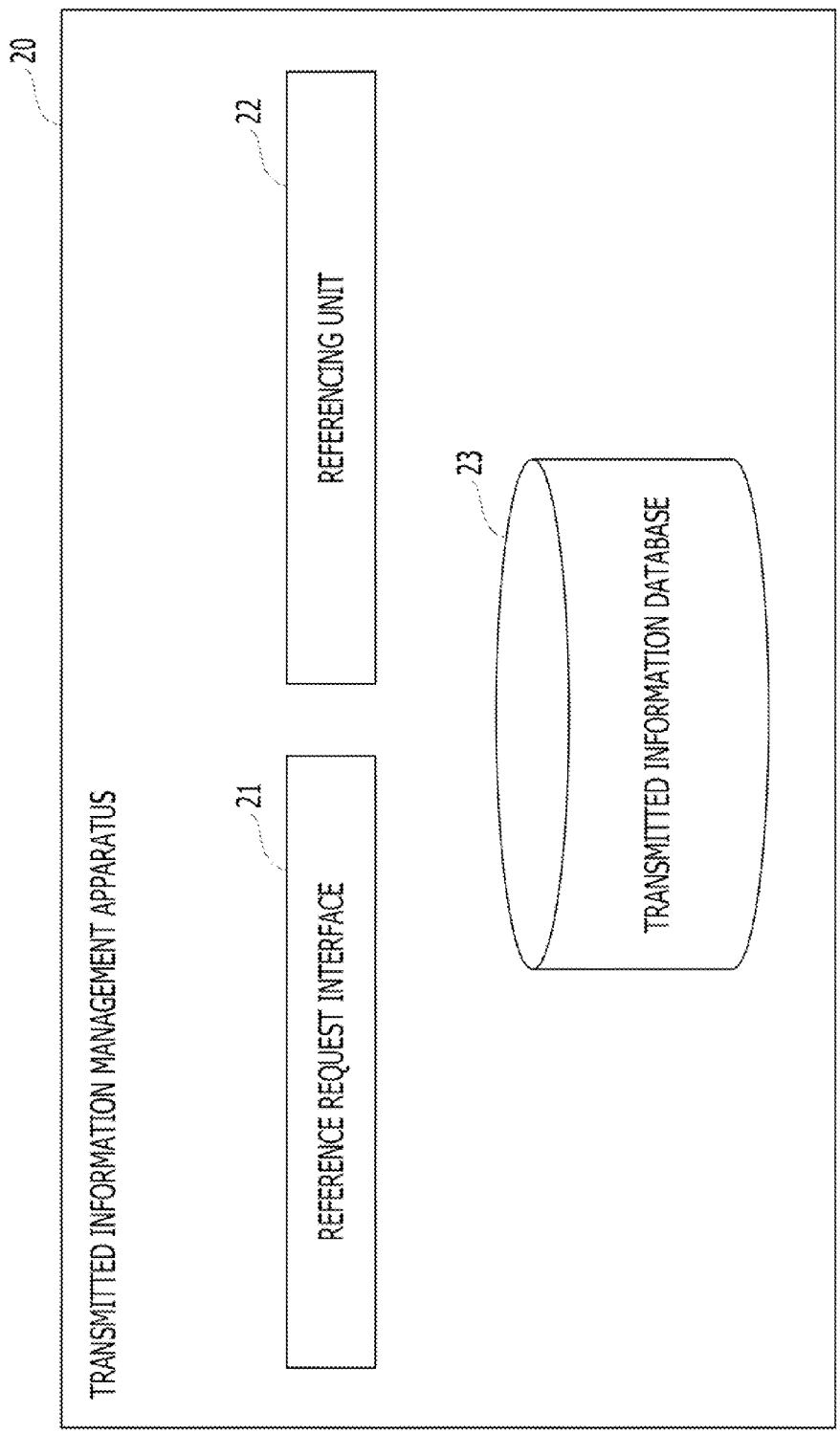

FIG.4

| SUBMISSION DATE AND TIME | LATITUDE | LONGITUDE | COMMENTS |
|---|---|---|---|
| 2007/03/10 11:00 | nnn.n | nnn.n | THE PLUM BLOSSOMS ARE PRETTY |
| 2008/03/12 10:30 | nnn.n | nnn.n | PLUM BLOSSOMS AT KAKIMOTO SHRINE |
| 2009/03/07 13:15 | nnn.n | nnn.n | THE PLUM BLOSSOMS ARE IN FULL BLOOM |
| 2007/03/31 14:10 | nnn.n | nnn.n | CHERRY BLOSSOMS AT AKASHI PARK |
| 2008/04/08 12:50 | nnn.n | nnn.n | WE CAME FOR FLOWER VIEWING AT AKASHI PARK |
| 2009/04/05 13:45 | nnn.n | nnn.n | THE CHERRY BLOSSOMS ARE IN FULL BLOOM! |
| 2007/11/18 16:05 | nnn.n | nnn.n | AUTUMN COLORS SEEN AT AKASHI PARK |
| 2008/11/29 11:25 | nnn.n | nnn.n | WE CAME TO SEE AUTUMN COLORS AT AKASHI PARK |
| 2008/12/01 13:30 | nnn.n | nnn.n | THE AUTUMN COLORS ARE PRETTY |
| 2007/08/21 19:00 | nnn.n | nnn.n | THE NIGHT VIEW IS PRETTY |
| 2008/02/15 20:15 | nnn.n | nnn.n | PHOTO OF AKASHI KAIKYO BRIDGE |
| 2008/12/24 20:55 | nnn.n | nnn.n | WE CAME TO SEE AKASHI KAIKYO BRIDGE LIGHT UP |
| ... | ... | ... | ... |

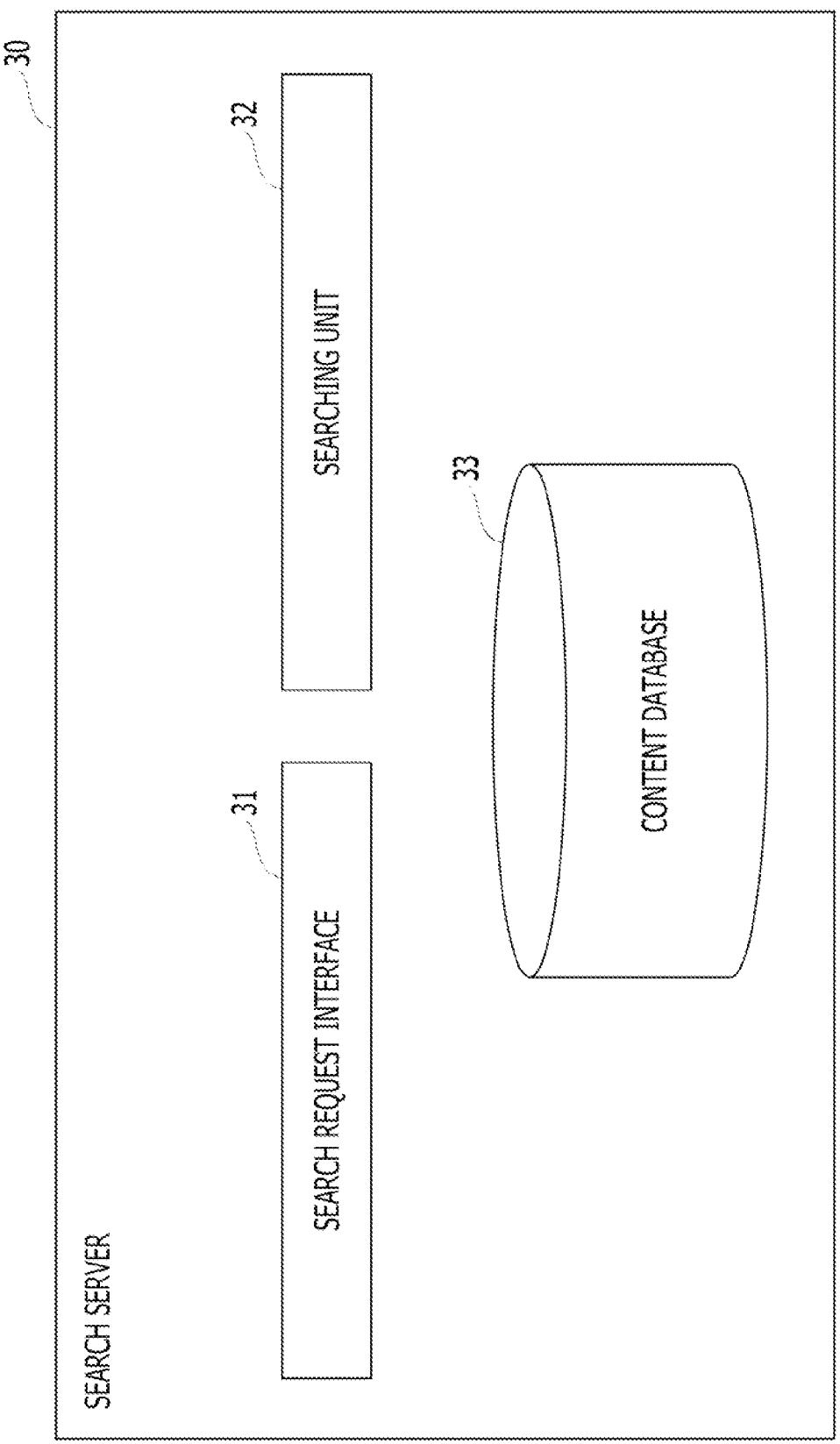

FIG.6

| SEARCH KEYWORD | URL |
|---|---|
| XXX | http://~/~/ |
| YYY | http://~/~/ |
| ZZZ | http://~/~/ |
| ... | ... |

FIG.9

| TRANSMISSION DATE | TRANSMISSION TIME | TRANSMISSION LATITUDE | TRANSMISSION LONGITUDE | KEYWORD |
|---|---|---|---|---|
| 03/10 | 11:00 | nnn.n | nnn.n | PLUM BLOSSOMS, PRETTY |
| 03/12 | 10:30 | nnn.n | nnn.n | KAKIMOTO SHRINE, PLUM BLOSSOMS |
| 03/07 | 13:15 | nnn.n | nnn.n | PLUM BLOSSOMS, FULL BLOOM |
| 03/31 | 14:10 | nnn.n | nnn.n | AKASHI PARK, CHERRY BLOSSOMS |
| 04/08 | 12:50 | nnn.n | nnn.n | AKASHI PARK, FLOWER VIEWING |
| 04/05 | 13:45 | nnn.n | nnn.n | CHERRY BLOSSOMS, FULL BLOOM |
| 11/18 | 16:05 | nnn.n | nnn.n | AKASHI PARK, AUTUMN COLORS |
| 11/29 | 11:25 | nnn.n | nnn.n | AKASHI PARK, AUTUMN COLORS |
| 12/01 | 13:30 | nnn.n | nnn.n | PRETTY, AUTUMN COLORS |
| 08/21 | 19:00 | nnn.n | nnn.n | NIGHT VIEW, PRETTY |
| 02/15 | 20:15 | nnn.n | nnn.n | AKASHI KAIKYO BRIDGE, PHOTO |
| 12/24 | 20:55 | nnn.n | nnn.n | AKASHI KAIKYO BRIDGE, LIGHT UP |
| ... | ... | ... | ... | ... |

FIG.11

| TRANSMISSION DATE | TRANSMISSION TIME | TRANSMISSION LATITUDE | TRANSMISSION LONGITUDE | KEYWORD | Et1 | Et2 | Ed | RATING VALUE |
|---|---|---|---|---|---|---|---|---|
| 03/10 | 11:00 | nnn.n | nnn.n | PLUM BLOSSOMS, PRETTY | 3.4% | 0.8% | 45.5% | 0.0001 |
| 03/12 | 10:30 | nnn.n | nnn.n | KAKIMOTO SHRINE, PLUM BLOSSOMS | 3.7% | 0.6% | 50.0% | 0.0001 |
| 03/07 | 13:15 | nnn.n | nnn.n | PLUM BLOSSOMS, FULL BLOOM | 3.1% | 6.3% | 43.5% | 0.0008 |
| 03/31 | 14:10 | nnn.n | nnn.n | AKASHI PARK, CHERRY BLOSSOMS | 12.5% | 1.4% | 66.7% | 0.0012 |
| 04/08 | 12:50 | nnn.n | nnn.n | AKASHI PARK, FLOWER VIEWING | 50.0% | 9.1% | 62.5% | 0.0284 |
| 04/05 | 13:45 | nnn.n | nnn.n | CHERRY BLOSSOMS, FULL BLOOM | 33.3% | 2.2% | 58.8% | 0.0043 |
| 11/18 | 16:05 | nnn.n | nnn.n | AKASHI PARK, AUTUMN COLORS | 0.7% | 0.5% | 55.6% | 0.0000 |
| 11/29 | 11:25 | nnn.n | nnn.n | AKASHI PARK, AUTUMN COLORS | 0.8% | 0.6% | 50.0% | 0.0000 |
| 12/01 | 13:30 | nnn.n | nnn.n | PRETTY, AUTUMN COLORS | 0.8% | 3.2% | 47.6% | 0.0001 |
| 08/21 | 19:00 | nnn.n | nnn.n | NIGHT VIEW, PRETTY | 0.7% | 0.3% | 33.3% | 0.0000 |
| 02/15 | 20:15 | nnn.n | nnn.n | AKASHI KAIKYO BRIDGE, PHOTO | 1.9% | 0.2% | 37.0% | 0.0000 |
| 12/24 | 20:55 | nnn.n | nnn.n | AKASHI KAIKYO BRIDGE, LIGHT UP | 1.0% | 0.2% | 40.0% | 0.0000 |
| ... | ... | ... | ... | ... | ... | ... | ... | ... |

FIG.12

| RANK | KEYWORD | RATING VALUE |
|---|---|---|
| 1 | AKASHI PARK, FLOWER VIEWING | 0.0284 |
| 2 | CHERRY BLOSSOMS, FULL BLOOM | 0.0043 |
| 3 | AKASHI PARK, CHERRY BLOSSOMS | 0.0012 |
| 4 | PLUM BLOSSOMS, FULL BLOOM | 0.0008 |
| 5 | PLUM BLOSSOMS, PRETTY | 0.0001 |
| 5 | KAKIMOTO SHRINE, PLUM BLOSSOMS | 0.0001 |
| 5 | PRETTY, AUTUMN COLORS | 0.0001 |
| 8 | AKASHI PARK, AUTUMN COLORS | 0.0000 |
| 8 | AKASHI PARK, AUTUMN COLORS | 0.0000 |
| 8 | NIGHT VIEW, PRETTY | 0.0000 |
| 8 | AKASHI KAIKYO BRIDGE, PHOTO | 0.0000 |
| 8 | AKASHI KAIKYO BRIDGE, LIGHT UP | 0.0000 |
| ⋮ | ⋮ | ⋮ |

FIG.13

| TRANSMISSION DATE | TRANSMISSION TIME | TRANSMISSION LATITUDE | TRANSMISSION LONGITUDE | KEYWORD | Et1 | Et2 | Ed | RATING VALUE |
|---|---|---|---|---|---|---|---|---|
| 03/10 | 11:00 | nnn.n | nnn.n | PLUM BLOSSOMS, PRETTY | 1.3% | 0.2% | 45.5% | 0.0000 |
| 03/12 | 10:30 | nnn.n | nnn.n | KAKIMOTO SHRINE, PLUM BLOSSOMS | 1.3% | 0.2% | 50.0% | 0.0000 |
| 03/07 | 13:15 | nnn.n | nnn.n | PLUM BLOSSOMS, FULL BLOOM | 1.4% | 0.2% | 43.5% | 0.0000 |
| 03/31 | 14:10 | nnn.n | nnn.n | AKASHI PARK, CHERRY BLOSSOMS | 1.0% | 0.2% | 66.7% | 0.0000 |
| 04/08 | 12:50 | nnn.n | nnn.n | AKASHI PARK, FLOWER VIEWING | 0.9% | 0.2% | 62.5% | 0.0000 |
| 04/05 | 13:45 | nnn.n | nnn.n | CHERRY BLOSSOMS, FULL BLOOM | 1.0% | 0.2% | 58.8% | 0.0000 |
| 11/18 | 16:05 | nnn.n | nnn.n | AKASHI PARK, AUTUMN COLORS | 2.7% | 0.3% | 55.6% | 0.0001 |
| 11/29 | 11:25 | nnn.n | nnn.n | AKASHI PARK, AUTUMN COLORS | 3.8% | 0.2% | 50.0% | 0.0000 |
| 12/01 | 13:30 | nnn.n | nnn.n | PRETTY, AUTUMN COLORS | 4.2% | 0.2% | 47.6% | 0.0000 |
| 08/21 | 19:00 | nnn.n | nnn.n | NIGHT VIEW, PRETTY | 0.8% | 0.8% | 33.3% | 0.0000 |
| 02/15 | 20:15 | nnn.n | nnn.n | AKASHI KAIKYO BRIDGE, PHOTO | 1.9% | 2.2% | 37.0% | 0.0001 |
| 12/24 | 20:55 | nnn.n | nnn.n | AKASHI KAIKYO BRIDGE, LIGHT UP | 100.0% | 16.7% | 40.0% | 0.0067 |
| ... | ... | ... | ... | ... | ... | ... | ... | ... |

FIG.14

| RANK | KEYWORD | RATING VALUE |
|---|---|---|
| 1 | AKASHI KAIKYO BRIDGE, LIGHT UP | 0.0067 |
| 2 | AKASHI PARK, AUTUMN COLORS | 0.0001 |
| 2 | AKASHI KAIKYO BRIDGE, PHOTO | 0.0001 |
| 4 | PLUM BLOSSOMS, PRETTY | 0.0000 |
| 4 | KAKIMOTO SHRINE, PLUM BLOSSOMS | 0.0000 |
| 4 | PLUM BLOSSOMS, FULL BLOOM | 0.0000 |
| 4 | AKASHI PARK, CHERRY BLOSSOMS | 0.0000 |
| 4 | AKASHI PARK, FLOWER VIEWING | 0.0000 |
| 4 | CHERRY BLOSSOMS, FULL BLOOM | 0.0000 |
| 4 | AKASHI PARK, AUTUMN COLORS | 0.0000 |
| 4 | PRETTY, AUTUMN COLORS | 0.0000 |
| 4 | NIGHT VIEW, PRETTY | 0.0000 |
| ⋮ | ⋮ | ⋮ |

FIG.16

| FILE NAME | COMMENTS |
|---|---|
| FILE A | THE PLUM BLOSSOMS ARE PRETTY |
| FILE B | PLUM BLOSSOMS AT KAKIMOTO SHRINE |
| FILE C | THE PLUM BLOSSOMS ARE IN FULL BLOOM |
| FILE D | CHERRY BLOSSOMS AT AKASHI PARK |
| FILE E | WE CAME FOR FLOWER VIEWING AT AKASHI PARK |
| FILE F | THE CHERRY BLOSSOMS ARE IN FULL BLOOM! |
| FILE G | AUTUMN COLORS SEEN AT AKASHI PARK |
| FILE H | WE CAME TO SEE AUTUMN COLORS AT AKASHI PARK |
| FILE I | THE AUTUMN COLORS ARE PRETTY |
| FILE J | THE NIGHT VIEW IS PRETTY |
| FILE K | PHOTO OF AKASHI KAIKYO BRIDGE |
| FILE L | WE CAME TO SEE AKASHI KAIKYO BRIDGE LIGHT UP |
| ... | ... |

FIG.17

| FILE NAME | SHOOTING DATE AND TIME | SHOOTING LATITUDE | SHOOTING LONGITUDE |
|---|---|---|---|
| FILE A | 2007/03/10 11:00 | nnn.n | nnn.n |
| FILE B | 2008/03/12 10:30 | nnn.n | nnn.n |
| FILE C | 2009/03/07 13:15 | nnn.n | nnn.n |
| FILE D | 2007/03/31 14:10 | nnn.n | nnn.n |
| FILE E | 2008/04/08 12:50 | nnn.n | nnn.n |
| FILE F | 2009/04/05 13:45 | nnn.n | nnn.n |
| FILE G | 2007/11/18 16:05 | nnn.n | nnn.n |
| FILE H | 2008/11/29 11:25 | nnn.n | nnn.n |
| FILE I | 2008/12/01 13:30 | nnn.n | nnn.n |
| FILE J | 2007/08/21 19:00 | nnn.n | nnn.n |
| FILE K | 2008/02/15 20:15 | nnn.n | nnn.n |
| FILE L | 2008/12/24 20:55 | nnn.n | nnn.n |
| ⋮ | ⋮ | ⋮ | ⋮ |

FIG.19

| TRANSMISSION DATE | TRANSMISSION TIME | TRANSMISSION LATITUDE | TRANSMISSION LONGITUDE | KEYWORD | PROPER NOUN COUNT |
|---|---|---|---|---|---|
| 03/10 | 11:00 | nnn.n | nnn.n | PLUM BLOSSOMS, PRETTY | 0 |
| 03/12 | 10:30 | nnn.n | nnn.n | KAKIMOTO SHRINE, PLUM BLOSSOMS | 1 |
| 03/07 | 13:15 | nnn.n | nnn.n | PLUM BLOSSOMS, FULL BLOOM | 0 |
| 03/31 | 14:10 | nnn.n | nnn.n | AKASHI PARK, CHERRY BLOSSOMS | 1 |
| 04/08 | 12:50 | nnn.n | nnn.n | AKASHI PARK, FLOWER VIEWING | 1 |
| 04/05 | 13:45 | nnn.n | nnn.n | CHERRY BLOSSOMS, FULL BLOOM | 0 |
| 11/18 | 16:05 | nnn.n | nnn.n | AKASHI PARK, AUTUMN COLORS | 1 |
| 11/29 | 11:25 | nnn.n | nnn.n | AKASHI PARK, AUTUMN COLORS | 1 |
| 12/01 | 13:30 | nnn.n | nnn.n | PRETTY, AUTUMN COLORS | 0 |
| 08/21 | 19:00 | nnn.n | nnn.n | NIGHT VIEW, PRETTY | 0 |
| 02/15 | 20:15 | nnn.n | nnn.n | AKASHI KAIKYO BRIDGE, PHOTO | 1 |
| 12/24 | 20:55 | nnn.n | nnn.n | AKASHI KAIKYO BRIDGE, LIGHT UP | 1 |
| ... | ... | ... | ... | ... | ... |

FIG.22

| TRANSMISSION DATE | TRANSMISSION TIME | TRANSMISSION LATITUDE | TRANSMISSION LONGITUDE | KEYWORD | p | Et1 | Et2 | Ed | Ep | RATING VALUE |
|---|---|---|---|---|---|---|---|---|---|---|
| 03/10 | 11:00 | nnn.n | nnn.n | PLUM BLOSSOMS, PRETTY | 0 | 3.4% | 0.8% | 45.5% | 0% | 0.0000 |
| 03/12 | 10:30 | nnn.n | nnn.n | KAKIMOTO SHRINE, PLUM BLOSSOMS | 1 | 3.7% | 0.6% | 50.0% | 100% | 0.0001 |
| 03/07 | 13:15 | nnn.n | nnn.n | PLUM BLOSSOMS, FULL BLOOM | 0 | 3.1% | 6.3% | 43.5% | 0% | 0.0000 |
| 03/31 | 14:10 | nnn.n | nnn.n | AKASHI PARK, CHERRY BLOSSOMS | 1 | 12.5% | 1.4% | 66.7% | 100% | 0.0012 |
| 04/08 | 12:50 | nnn.n | nnn.n | AKASHI PARK, FLOWER VIEWING | 1 | 50.0% | 9.1% | 62.5% | 100% | 0.0284 |
| 04/05 | 13:45 | nnn.n | nnn.n | CHERRY BLOSSOMS, FULL BLOOM | 0 | 33.3% | 2.2% | 58.8% | 0% | 0.0000 |
| 11/18 | 16:05 | nnn.n | nnn.n | AKASHI PARK, AUTUMN COLORS | 1 | 0.7% | 0.5% | 55.6% | 100% | 0.0000 |
| 11/29 | 11:25 | nnn.n | nnn.n | AKASHI PARK, AUTUMN COLORS | 1 | 0.8% | 0.6% | 50.0% | 100% | 0.0000 |
| 12/01 | 13:30 | nnn.n | nnn.n | PRETTY, AUTUMN COLORS | 0 | 0.8% | 3.2% | 47.6% | 0% | 0.0000 |
| 08/21 | 19:00 | nnn.n | nnn.n | NIGHT VIEW, PRETTY | 0 | 0.7% | 0.3% | 33.3% | 0% | 0.0000 |
| 02/15 | 20:15 | nnn.n | nnn.n | AKASHI KAIKYO BRIDGE, PHOTO | 1 | 1.9% | 0.2% | 37.0% | 100% | 0.0000 |
| 12/24 | 20:55 | nnn.n | nnn.n | AKASHI KAIKYO BRIDGE, LIGHT UP | 1 | 1.0% | 0.2% | 40.0% | 100% | 0.0000 |
| ... | ... | ... | ... | ... | ... | ... | ... | ... | ... | ... |

FIG.23

| RANK | KEYWORD | RATING VALUE |
|---|---|---|
| 1 | AKASHI PARK, FLOWER VIEWING | 0.0284 |
| 2 | AKASHI PARK, CHERRY BLOSSOMS | 0.0012 |
| 3 | KAKIMOTO SHRINE, PLUM BLOSSOMS | 0.0001 |
| 4 | PLUM BLOSSOMS, PRETTY | 0.0000 |
| 4 | PLUM BLOSSOMS, FULL BLOOM | 0.0000 |
| 4 | CHERRY BLOSSOMS, FULL BLOOM | 0.0000 |
| 4 | PRETTY, AUTUMN COLORS | 0.0000 |
| 4 | AKASHI PARK, AUTUMN COLORS | 0.0000 |
| 4 | AKASHI PARK, AUTUMN COLORS | 0.0000 |
| 4 | NIGHT VIEW, PRETTY | 0.0000 |
| 4 | AKASHI KAIKYO BRIDGE, PHOTO | 0.0000 |
| 4 | AKASHI KAIKYO BRIDGE, LIGHT UP | 0.0000 |
| ⋮ | ⋮ | ⋮ |

FIG.24

| TRANSMISSION DATE | TRANSMISSION TIME | TRANSMISSION LATITUDE | TRANSMISSION LONGITUDE | KEYWORD | p | Et1 | Et2 | Ed | Ep | RATING VALUE |
|---|---|---|---|---|---|---|---|---|---|---|
| 03/10 | 11:00 | nnn.n | nnn.n | PLUM BLOSSOMS, PRETTY | 0 | 1.3% | 0.2% | 45.5% | 0% | 0.0000 |
| 03/12 | 10:30 | nnn.n | nnn.n | KAKIMOTO SHRINE, PLUM BLOSSOMS | 1 | 1.3% | 0.2% | 50.0% | 100% | 0.0000 |
| 03/07 | 13:15 | nnn.n | nnn.n | PLUM BLOSSOMS, FULL BLOOM | 0 | 1.4% | 0.2% | 43.5% | 0% | 0.0000 |
| 03/31 | 14:10 | nnn.n | nnn.n | AKASHI PARK, CHERRY BLOSSOMS | 1 | 1.0% | 0.2% | 66.7% | 100% | 0.0000 |
| 04/08 | 12:50 | nnn.n | nnn.n | AKASHI PARK, FLOWER VIEWING | 1 | 0.9% | 0.2% | 62.5% | 100% | 0.0000 |
| 04/05 | 13:45 | nnn.n | nnn.n | CHERRY BLOSSOMS, FULL BLOOM | 0 | 1.0% | 0.2% | 58.8% | 0% | 0.0000 |
| 11/18 | 16:05 | nnn.n | nnn.n | AKASHI PARK, AUTUMN COLORS | 1 | 2.7% | 0.3% | 55.6% | 100% | 0.0001 |
| 11/29 | 11:25 | nnn.n | nnn.n | AKASHI PARK, AUTUMN COLORS | 1 | 3.8% | 0.2% | 50.0% | 100% | 0.0000 |
| 12/01 | 13:30 | nnn.n | nnn.n | PRETTY, AUTUMN COLORS | 0 | 4.2% | 0.2% | 47.6% | 0% | 0.0000 |
| 08/21 | 19:00 | nnn.n | nnn.n | NIGHT VIEW, PRETTY | 0 | 0.8% | 0.8% | 33.3% | 0% | 0.0000 |
| 02/15 | 20:15 | nnn.n | nnn.n | AKASHI KAIKYO BRIDGE, PHOTO | 1 | 1.9% | 2.2% | 37.0% | 100% | 0.0001 |
| 12/24 | 20:55 | nnn.n | nnn.n | AKASHI KAIKYO BRIDGE, LIGHT UP | 1 | 100.0% | 16.7% | 40.0% | 100% | 0.0067 |
| ... | ... | ... | ... | ... | ... | ... | ... | ... | ... | ... |

FIG.25

| RANK | KEYWORD | RATING VALUE |
|---|---|---|
| 1 | AKASHI KAIKYO BRIDGE, LIGHT UP | 0.0067 |
| 2 | AKASHI PARK, AUTUMN COLORS | 0.0001 |
| 2 | AKASHI KAIKYO BRIDGE, PHOTO | 0.0001 |
| 4 | PLUM BLOSSOMS, PRETTY | 0.0000 |
| 4 | KAKIMOTO SHRINE, PLUM BLOSSOMS | 0.0000 |
| 4 | PLUM BLOSSOMS, FULL BLOOM | 0.0000 |
| 4 | AKASHI PARK, CHERRY BLOSSOMS | 0.0000 |
| 4 | AKASHI PARK, FLOWER VIEWING | 0.0000 |
| 4 | CHERRY BLOSSOMS, FULL BLOOM | 0.0000 |
| 4 | AKASHI PARK, AUTUMN COLORS | 0.0000 |
| 4 | PRETTY, AUTUMN COLORS | 0.0000 |
| 4 | NIGHT VIEW, PRETTY | 0.0000 |
| ⋮ | ⋮ | ⋮ |

LOCATION AND KEYWORD BASED INFORMATION PROVIDING APPARATUS, METHOD, AND MEMORY MEDIUM

CROSS-REFERENCES TO RELATED APPLICATIONS

This application is based upon and claims the benefit of priority of the prior Japanese Patent Application No. 2009-216041, filed on Sep. 17, 2009, the entire contents of which are incorporated herein by reference.

FIELD

The embodiments herein relate to an information providing apparatus, an information providing method, and a memory medium storing a information providing program, wherein information is provided according to the location of the recipient communication apparatus.

BACKGROUND

In recent years, users have written a variety of information to blogs, forums, and other sites published on the Internet. Such information includes ratings and impressions with respect to shops, facilities, and tourist locations, for example. In addition, the managers and administrators of such shops, facilities, and tourist locations also provide information via a network. Viewers utilize this information published on the Internet as material for determining whether or not to make use of or visit particular shops, facilities, and tourist locations.

With the technology disclosed in Japanese Unexamined Patent Application Publication No. 2000-76280, the URL of information content published on the Internet is stored in association with location information related to that URL. Subsequently, JP-A-2000-76280 discloses that, as a result of a user providing a region that specifies the geographical location of a region he or she wants to look up, information content related to that region is referenced.

In addition, with the technology disclosed in Japanese Unexamined Patent Application Publication No. 2007-264766, shop location information is extracted from content, and structured information is created by using content summary information and the shop location information as information elements. Subsequently, when the present location of a mobile device is acquired, the structured information is referenced, shops existing in the vicinity of the present location are specified. Furthermore, JP-A-2007-264766 also discloses that content to be provided that corresponds to the specified shops is also created.

According to the technologies disclosed in JP-A-2000-76280 and JP-A-2007-264766, information content related to a user-provided location may be referenced. Herein, such information content may be information from blogs, forums, or other sites published on the Internet.

Meanwhile, with the technology disclosed in Japanese Unexamined Patent Application Publication No. 2003-303148, location information as well as rating information is acquired from the users or managers of shops or other facilities. Subsequently, JP-A-2003-303148 discloses that such rating information is delivered to the users of mobile devices existing in an area that corresponds to the acquired location information. Herein, the rating information is the type of information sometimes referred to as word-of-mouth information.

According to the technology disclosed in JP-A-2003-303148, rating information may be quickly delivered to users.

SUMMARY

According to an aspect of the invention, an information providing apparatus includes: a communication unit to receive transmitted information containing first location information associated with a first communication apparatus; a registering unit to extract, from the transmitted information, one or more keywords expressing a characteristic of the transmitted information and the first location information, and to register the first location information and the one or more keywords in a keyword database that stores the transmitted information associated with the first communication apparatus; a request interface to receive a request for information from a second communication apparatus and a second location information associated with the second communication apparatus; an extractor to reference the keyword database and to extract one or more keywords based on the second location information; and a search requesting unit to output a search request containing the one or more keywords extracted by the extractor, wherein the search request is output to another computer that executes a search based on the one or more keywords extracted to provide information to the second communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 schematically illustrates the overall configuration of an information providing system in accordance with an embodiment;

FIG. 2 is a block diagram illustrating the functional configuration of a mobile apparatus;

FIG. 3 is a block diagram illustrating the functional configuration of a transmitted information management apparatus;

FIG. 4 conceptually illustrates one example of the content stored in a transmitted information database;

FIG. 5 is a block diagram illustrating the functional configuration of a search server;

FIG. 6 conceptually illustrates one example of the content stored in a content database;

FIG. 9 conceptually illustrates one example of the content stored in a keyword database;

FIG. 11 illustrates one example of keyword rating results in Embodiment 1;

FIG. 12 illustrates one example of keyword rating results in Embodiment 1;

FIG. 13 illustrates one example of keyword rating results in Embodiment 1;

FIG. 14 illustrates one example of keyword rating results in Embodiment 1;

FIG. 16 conceptually illustrates one example of the content stored in a transmitted information database;

FIG. 17 illustrates associations between respective submitted images, shooting dates and times, and shooting locations;

FIG. 19 conceptually illustrates one example of the content stored in a keyword database;

FIG. 22 illustrates one example of keyword rating results in Embodiment 3;

FIG. 23 illustrates one example of keyword rating results in Embodiment 3;

FIG. 24 illustrates one example of keyword rating results in Embodiment 3; and

FIG. 25 illustrates one example of keyword rating results in Embodiment 3.

DESCRIPTION OF EMBODIMENTS

Figure 7:
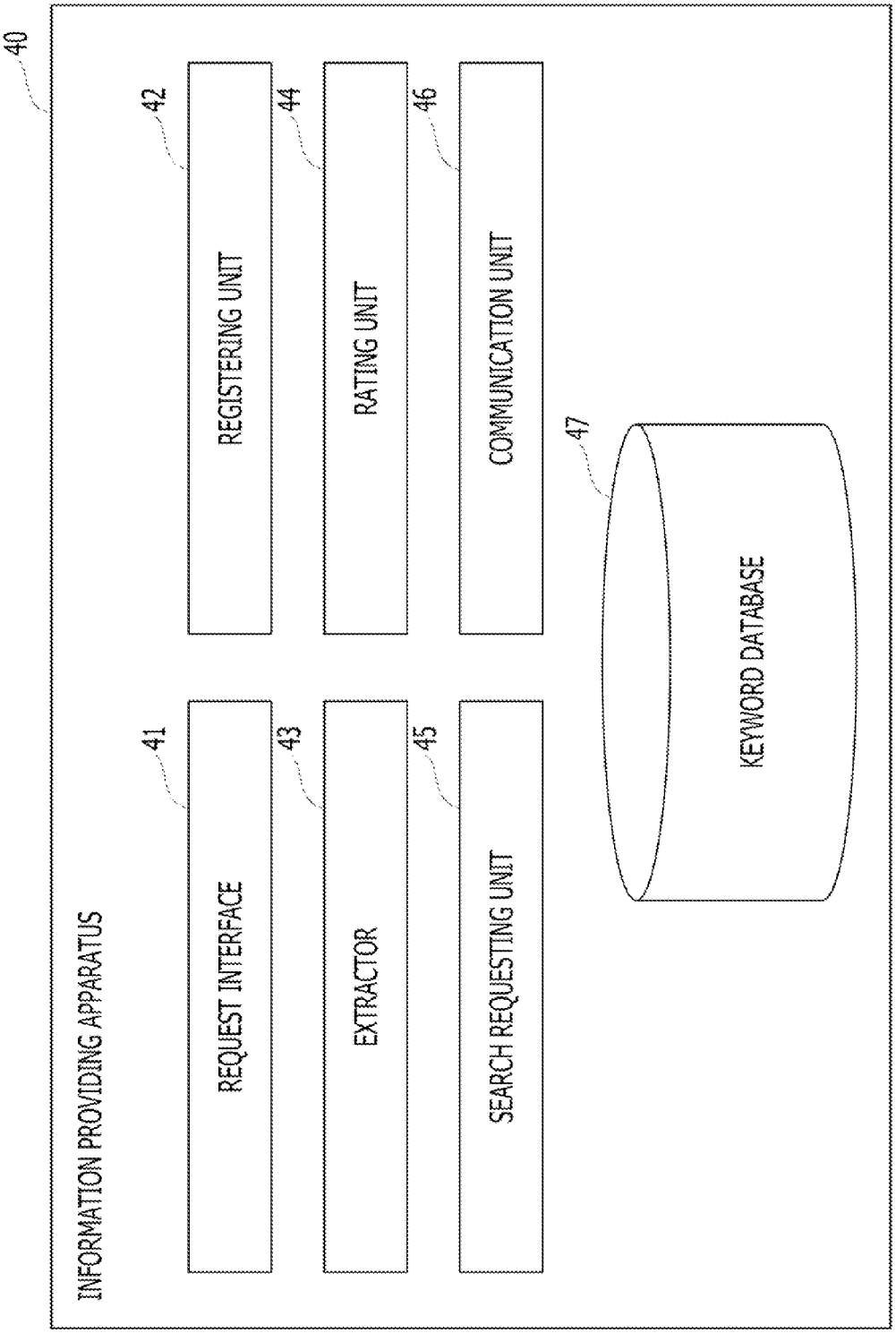
FIG. 7 is a block diagram illustrating the functional configuration of an information providing apparatus.

When a user wants to obtain information related to surrounding area around the user's location, he or she uses a mobile device to look up information content published on the Internet. When searching for desired information content, the user may, for example, use an information searching system wherein keywords are input to search for information.

The mobile device is primarily a device such as a mobile phone handset, a Personal Handyphone System (PHS), or a personal digital assistant (PDA) provided with wireless communication functions, for example. Text input using a mobile device may be more troublesome for the user compared to text input using the keyboard of a PC device. This is because factors such as the number and size of input keys may be limited. In cases where the user is using an information searching system to obtain desired information, the user will often input search keywords many times until the desired information is obtained. Consequently, text input using a mobile phone handset exerts an increasingly large burden on the user as the number of input operations increases.

According to JP-A-2000-76280 and JP-A-2007-264766, the user may look up information content without using a mobile device to input search keywords.

However, with the technology disclosed in JP-A-2000-76280, it is necessary to store in advance the URLs of information content published on the Internet in association with location information related to those URLs. Consequently, the technology disclosed in JP-A-2000-76280 is difficult to apply to extremely large amounts of information content.

Furthermore, with the technology disclosed in JP-A-2007-264766, structured information that associates content summary information with shop location information must be created with respect to the content published on the Internet.

Meanwhile, according to the technology disclosed in JP-A-2003-303148, a user may obtain word-of-mouth information about the surrounding area by providing location information via his or her mobile device.

However, the word-of-mouth information obtained is information that has been transmitted from other mobile devices. Thus, text input is troublesome for the transmitting persons. The burden is particularly large in the case of inputting long sentences using a mobile phone handset. Thus, it may be assumed that the word-of-mouth information obtained from other mobile devices will contain comparatively short sentences. Depending on the user trying to obtain information, such word-of-mouth information will not contain sufficient information in many cases.

An information providing method described herein enables appropriate information to be provided by way of comparatively simple user operations with respect to a mobile device.

Hereinafter, embodiments will be described in detail on the basis of the drawings.

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present.

Embodiment 1

FIG. 1 schematically illustrates the overall configuration of an information providing system in accordance with the present embodiment. The information providing system in accordance with the present embodiment is provided with a plurality of mobile apparatuses 10, a transmitted information management apparatus 20, a search server 30, and an information providing apparatus 40. The above apparatus are all communicably connected to each other.

The plurality of mobile apparatuses 10 are communication apparatus such as mobile phone handsets, PDAs, or car navigation systems, for example. The mobile apparatus 10 travel together with users. The mobile apparatus 10 include functions for acquiring current location information, as well as date and time information. The mobile apparatus 10 transmit current location information as well as date and time information to the information providing apparatus 40. In addition, the mobile apparatus 10 acquire information from the information providing apparatus 40 according to their current location and the current date and time.

The transmitted information management apparatus 20 manages transmitted information that has been transmitted by users. The transmitted information management apparatus 20 may be a mobile phone word-of-mouth information system, a mobile phone SNS system, or a mobile phone email system, for example. The transmitted information management apparatus 20 manages the transmitted information in association with the location from where the information was transmitted, as well as the date and time when the information was transmitted. The transmitted information itself may be comment text, for example.

Using one of the mobile apparatus 10, a user transmits information that he or she wants to register to the transmitted information management apparatus 20. In so doing, that information may be registered in the transmitted information management apparatus 20. In addition, after having obtained information that the user wants to register, the user may also move to a different location and transmit the information after the fact by using a personal computer or similar apparatus. Herein, it is desirable for the transmitted information to contain both the location information as well as the date and time information for the acquired information, even in cases where the information is transmitted after the fact.

The search server 30 is an apparatus that provides Internet search services. The search server 30 receives search keywords from an external source, and replies by transmitting the search results to the search keyword sender. In the search server 30, various content published on the Internet is periodically collected. The search server 30 extracts search keywords from the collected content, while also creating content summary information. The search server 30 stores the search keywords and the content summary information in association with each other. Upon receiving a search keyword from an external source, the search server 30 reads out summary information stored in association with the search keyword. The search server 30 then replies by transmitting search results to the search keyword sender in the form of the read-out summary information.

The information providing apparatus 40 selectively provides optimal information according to the location of a particular mobile apparatus 10 as well as the date and time when such information is to be provided. From among the transmitted information registered in the transmitted information management apparatus 20, the information providing apparatus 40 extracts transmitted information that is close to both the location of the mobile apparatus 10 to be provided with information, as well as the date and time when such information is to be provided. The information providing apparatus 40 generates one or a plurality of search keywords from the transmitted information thus extracted. Subsequently, the information providing apparatus 40 sends the generated search keyword (or keywords) to the search server 30. The information providing apparatus 40 then acquires search results from the search server 30. On the basis of the acquired search results, the information providing apparatus 40 generates the information to be provided to the mobile apparatus 10. Subsequently, the information providing apparatus 40 provides the generated information to the mobile apparatus 10.

FIG. 2 is a block diagram illustrating the functional configuration of a mobile apparatus 10. The mobile apparatus 10 is provided with a location acquirer 11, a time acquirer 12, an information requester 13, and a receiver 14.

The location acquirer 11 acquires current location information for the mobile apparatus 10. For example, the current location information may be latitude and longitude information acquired by a GPS or similar device. The time acquirer 12 acquires current date and time information by way of a clock or similar device.

The information requester 13 sends the current location information and the current date and time information to the information providing apparatus 40. In addition, the information requester 13 also sends to the information providing apparatus 40 a request for information according to the current location information and the current date and time information. The information request may be executed as a result of the user performing a certain key operation on the mobile apparatus 10, for example. The receiver 14 receives information sent from the information providing apparatus 40 in response to an information request, and presents the received information to the user.

The present embodiment is configured such that a request for information is sent to the information providing apparatus as a result of the user performing a certain key operation. However, an embodiment may also be configured such that an existing system that detects nearby mobile apparatus 10 is installed at specific facilities, shops, and train station ticket gates, for example. The system may then send to the information providing apparatus 40 information regarding a detected date and time, place, and mobile apparatus 10. Information may then be provided from the information providing apparatus 40 to the mobile apparatus 10.

FIG. 3 is a block diagram illustrating the functional configuration of a transmitted information management apparatus 20. The transmitted information management apparatus 20 is provided with a reference request interface 21, a referencing unit 22, and a transmitted information database 23.

The reference request interface 21 receives reference requests with respect to transmitted information managed by the transmitted information database 23. On the basis of a reference request received by the reference request interface 21, the referencing unit 22 reads out transmitted information from the transmitted information database 23. The referencing unit 22 then sends the read-out transmitted information to the request source.

FIG. 4 conceptually illustrates one example of the content stored in the transmitted information database 20. The transmitted information database 23 contains information transmitted by users from a variety of places at a variety of dates and times. For example, the transmitted information database 23 may store a submission date and time, latitude and longitude values, and comments in association with each other. The submission date and time is the time at which particular information was transmitted. The latitude and longitude values are the place from where the information was transmitted. The comments are the information transmitted by the user using a mobile apparatus 10.

FIG. 5 is a block diagram illustrating the functional configuration of a search server 30. The search server 30 is provided with a search request interface 31, a searching unit 32, and a content database 33.

The search request interface 31 receives information search requests submitted to the search server 30. At this point, the search request interface 31 receives a search keyword from the request source. The searching unit 32 searches the content database 33 for the URLs of Web pages that match the search keyword received by the search request interface 31, and sends the retrieved URLs to the request source.

FIG. 6 conceptually illustrates one example of the content stored in the content database 33. In the content database 33, the URLs of Web pages published on the Internet are managed in association with keywords appearing on the Web pages. Herein, the keywords appearing on the Web pages become search keywords.

FIG. 7 is a block diagram illustrating the functional configuration of the information providing apparatus 40. The information providing apparatus 40 is provided with a request interface 41, a registering unit 42, an extractor 43, a rating unit 44, a search requesting unit, a communication unit 46, and a keyword database 47.

The request interface 41 receives information requests submitted to the information providing apparatus 40. The request interface 41 also receives current location information and current date and time information from a mobile apparatus 10.

The registering unit 42 references the transmitted information managed by the transmitted information management apparatus 20, and acquires transmitted information containing a submission date and time, a latitude value, a longitude value, and comments. From the transmitted information thus acquired, the registering unit 42 extracts a transmission date, a transmission time, a transmission latitude value, a transmission longitude value, and one or more keywords. Subsequently, the registering unit 42 associates and registers the extracted information in the keyword database 47. Herein, the registering unit 42 conducts a morphological analysis with respect to the comment text contained in the transmitted information. Subsequently, the registering unit 42 selects one or more nouns from the word groups obtained by the morphological analysis, and registers the selected nouns as keywords.

From the keyword database 47, the extractor 43 extracts keywords corresponding to locations within a fixed zone centered on the current location of the mobile apparatus 10. At this point, if the mobile apparatus 10 is moving, then the extractor 43 identifies the travel direction. The extractor 43 may be configured to subsequently extract keywords corresponding to locations within a fixed zone centered on a bearing extending from the location of the mobile apparatus in the travel direction.

The rating unit 44 conducts weighted rating of keywords extracted by the extractor 43. As a result of receiving current location information and current date and time information, the request interface 41 is able to detect the information recipient. Thus, the rating unit 44 compares both the location of the detected apparatus as well as the detected date and time against transmission locations and transmission dates and times associated with the keywords extracted by the extractor 43. Subsequently, on the basis of the comparison results, the rating unit 44 conducts weighted rating of the extracted keywords.

For example, the rating unit 44 may respectively extract the following: the relative distance between the location of the information recipient apparatus and the place where particular information was transmitted; the relative number of days between the day when the information recipient apparatus was detected and the day when particular information was transmitted; and the relative amount of time between the time when the information recipient apparatus was detected and the time when particular information was transmitted. The rating unit 44 then applies greater weights to keywords having closer relative distances, relative numbers of days, and relative amounts of time.

It is possible to appropriately set weights with respect to the relative distances, relative numbers of days, and relative amounts of time. For example, it is also possible for the information provider to set weights in advance. In addition, it is also possible for the rating unit 44 to dynamically set weights according to the location of the information recipient apparatus and the time when the apparatus was detected. For example, in cases where the location of the information recipient apparatus indicates a specific place, large weights may be set with respect to the relative distances. Such specific places may include train stations, tourist spots, or other locations, for example. In addition, in cases where the day when the information recipient was detected indicates a specific date, large weights may be set with respect to the relative numbers of days. Such specific dates may include weekends, holidays, or days when events are being held, for example.

In addition, although the present embodiment is configured such that both the relative number of days and the relative amount of time are included in the ratings, an embodiment may also be configured such that only one of either the relative number of days or the relative amount of time is included in the ratings.

The search requesting unit 45 takes a fixed number of search keywords from among the top-ranked keywords rated by the rating unit 44, and sends the selected keywords to the search server 30. In other words, the search requesting unit 45 issues information search requests to the search server 30. Additionally, on the basis of the latitude and longitude values associated with the keywords, the search requesting unit 45 may also acquire information on place names or landmarks, and add the acquired information to the search keywords.

The communication unit 46 receives search results sent by the search server 30 in response to a search request. The communication unit 46 provides the search results to the mobile apparatus 10 detected as the information recipient. At this point, the communication unit 46 may send the received search results to the mobile apparatus 10 as-is. However, the communication unit 46 may also process the search results for easier viewing on the mobile apparatus 10.

For example, with a mobile apparatus 10 such as a mobile phone handset, the amount of information than may be displayed at one time is limited. Consequently, the communication unit 46 may be configured to provide just the top-ranked search results from among the entire search results. Alternatively, the communication unit 46 may be configured to provide just the titles of the content found by search, without providing the full text of the search results.

Figure 8:
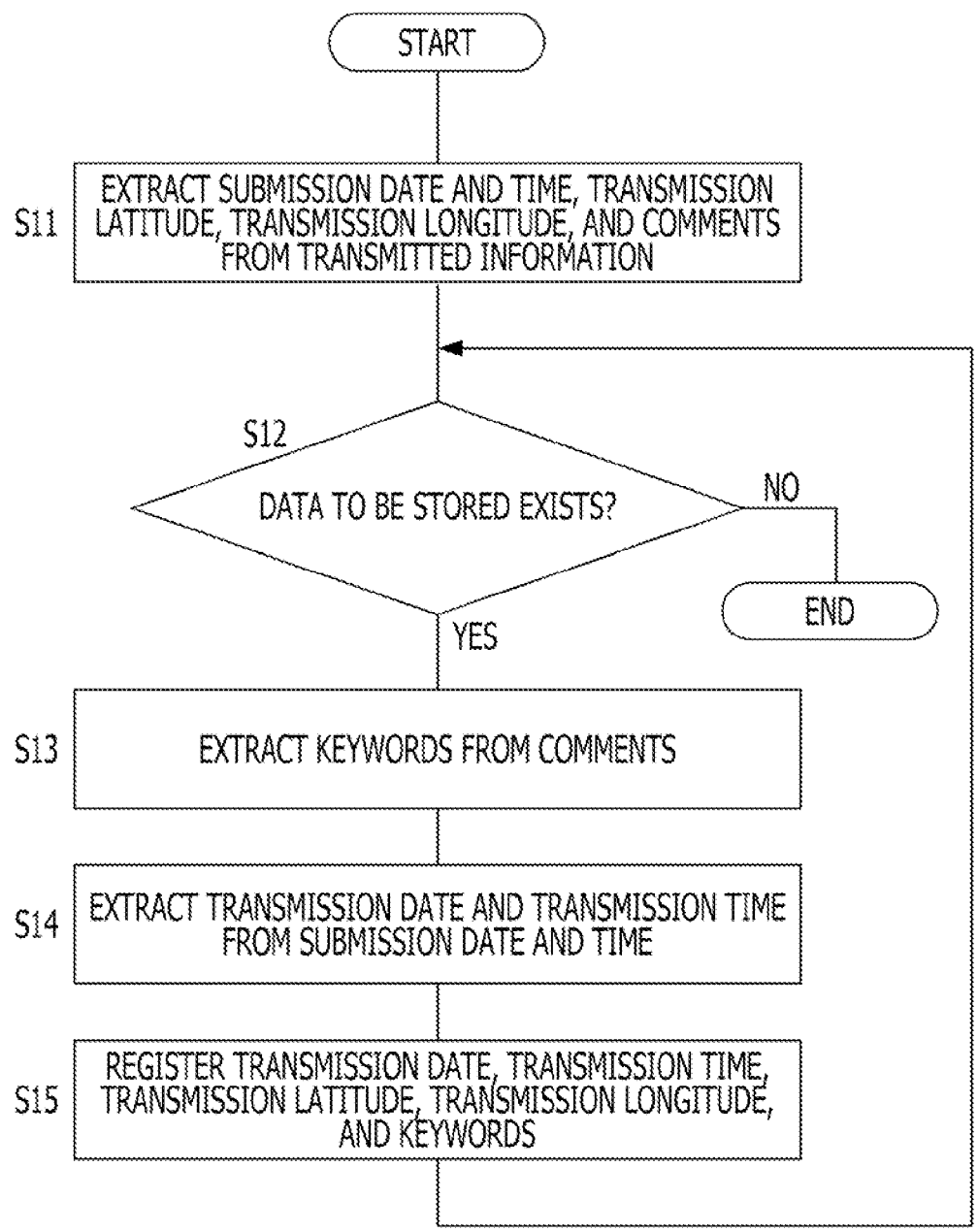
FIG. 8 is a flowchart explaining the operation of a keyword registration process executed by an information providing apparatus.

A keyword registration process executed by the information providing apparatus 40 will now be described. FIG. 8 is a flowchart explaining the steps of a keyword registration process executed by the information providing apparatus 40. The information providing apparatus 40 acquires transmitted information that has been registered in the transmitted information database 23 of the transmitted information management apparatus 20. Subsequently, the information providing apparatus 40 extracts the submission date and time, transmission latitude, transmission longitude, and comments (S11).

The information providing apparatus 40 determines whether or not there exists data to be stored in the keyword database 47 (S12). If data to be stored does exist (S12: YES), then the information providing apparatus 40 uses morphological analysis to extract keywords in the form of nouns contained in the comments (S13). For example, if only a single noun is contained in the comments, then that single noun is extracted as a keyword. In contrast, if a plurality of nouns are contained in the comments, then a plurality of keywords are extracted. If it is determined in S12 that data to be stored does not exist (S12: NO), then the keyword registration process is terminated.

In addition, from the submission date and time contained in the transmitted information, the information providing apparatus 40 extracts the transmission date and the transmission time of the information (S14).

Subsequently, the information providing apparatus 40 stores the following in the keyword database 47: the transmission date and transmission time extracted in S14, the transmission latitude and transmission longitude extracted in S11, and the one or more keywords extracted in S13 (S15).

FIG. 9 conceptually illustrates one example of the content stored in the keyword database 47. The keyword database 47 manages information transmitted by users from a variety of places at a variety of dates and times. In other words, the keyword database 47 stores transmission dates, transmission times, transmission latitude values, transmission longitude values, and keywords in association with each other. The above information stored in the keyword database 47 is information that has been extracted from the transmitted information registered in the transmitted information database 23 of the transmitted information management apparatus 20.

Figure 10:
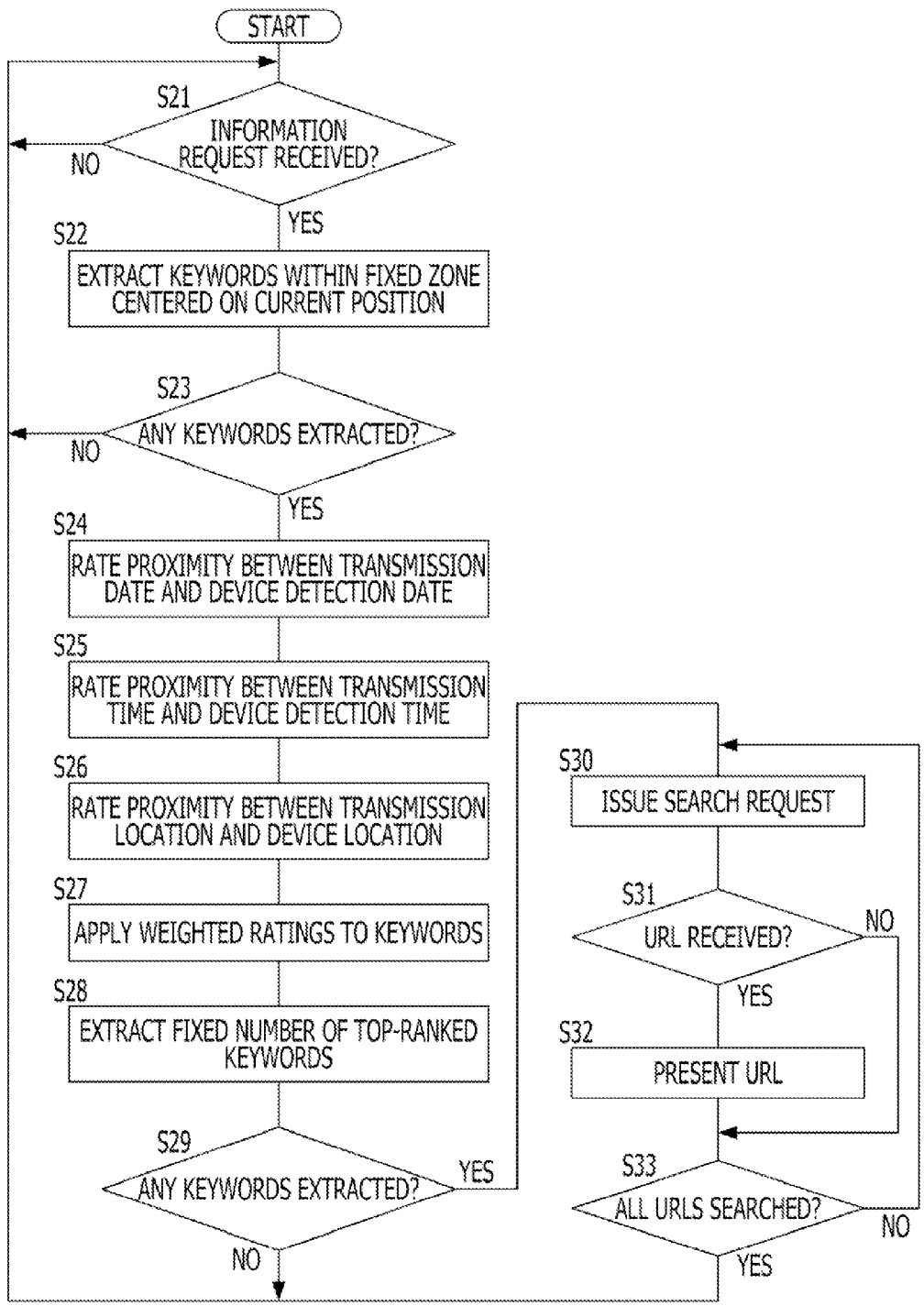
FIG. 10 is a flowchart explaining the operation of an information providing process executed by an information providing apparatus.

An information providing process executed by the information providing apparatus 40 will now be described. FIG. 10 is a flowchart explaining the steps of an information providing process executed by the information providing apparatus 40. The information providing apparatus 40 determines whether or not an information request has been received from a mobile apparatus 10 (S21). The information providing apparatus 40 may determine that an information request has been received upon receiving current location information as well as current date and time information, for example. If it is determined that an information request has not been received (S21: NO), then the information providing apparatus 40 stands by until an information request is received.

If it is determined that an information request has been received (S21: YES), then the information providing apparatus 40 references the keyword database 47 and extracts keywords corresponding to positions within a fixed zone centered on the current position (i.e., location) of the mobile apparatus 10 (S22). If the current position of the mobile apparatus 10 is given by a latitude X and a longitude Y, then the information providing apparatus 40 extracts keywords in the range defined by the latitude X±α and the longitude Y±α.

Subsequently, the information providing apparatus 40 determines whether or not any keywords have been extracted from the keyword database 47 (S23). If no relevant keywords have been extracted (S23: NO), then the information providing apparatus 40 returns the process to S21.

If keywords have been extracted (S23: YES), then for each extracted keyword, the information providing apparatus 40 respectively rates the proximity between the transmission date registered in the keyword database, and the date when the mobile apparatus 10 was detected (S24). One example of a rating formula is given by the rating adjustment ratio Et1 (%), and computed according to Et1=1/(t1+1). This rating adjustment ratio Et1 is inversely proportional to the difference between the dates, with Et1 becoming 100% when the dates are the same day, and decreasing as the dates become farther apart. Herein, t1 is the difference (e.g., the number of days) between the date when particular information was submitted (e.g., the transmission date), and the date when the information recipient (e.g., a mobile apparatus 10) was detected (e.g., the detection date).

Subsequently, for each extracted keyword, the information providing apparatus 40 rates the proximity between the transmission time registered in the keyword database, and the time when the mobile apparatus 10 was detected (S25). One example of a rating formula is given by the rating adjustment ratio Et2 (%), and computed according to Et2=1/(t2+1). This rating adjustment ratio Et2 is inversely proportional to the difference between the times, with Et2 becoming 100% when the times are the same, and decreasing as the times become farther apart. Herein, t2 is the difference (e.g., the amount of time) between the time when particular information was submitted (e.g., the transmission time), and the time when the information recipient (e.g., a mobile apparatus 10) was detected (e.g., the detection time).

Subsequently, for each extracted keyword, the information providing apparatus 40 rates the proximity between the transmission location registered in the keyword database, and the location of the mobile apparatus 10 (S26). One example of a rating formula is given by the rating adjustment ratio Ed (%), and computed according to Ed=1/(d+1). This rating adjustment ratio Ed is inversely proportional to the relative distance between the locations, with Ed becoming 100% when the locations are the same, and decreasing as the locations become farther apart. Herein, d is the relative distance (km) between the location (e.g., the latitude and longitude) where particular information was submitted, and the location (e.g., the latitude and longitude) of the information recipient (e.g., a mobile apparatus 10).

Subsequently, the information providing apparatus 40 conducts weighted rating of each extracted keyword (S27). The weighted rating E is the product of Et1, Et2, and Ed computed in S24 to S26, and computed according to Et1*Et2*Ed.

In the present embodiment, rating adjustment ratios Et1, Et2, and Ed are computed in S24 to S26 as rating values for the relative numbers of days, relative amounts of time, and relative distances with respect to individual keywords. However, a rating formula may also be used wherein the rating values increase as the relative numbers of days, relative amounts of time, and relative distances become respectively closer.

In addition, in the present embodiment, the rating values in S24 to S26 are computed in the following order: relative numbers of days, relative amounts of time, and relative distances. However, the order in which rating values are computed is not limited to the above. Furthermore, an embodiment may also be configured to compute a final weighted rating E according to E=1/{(t1+1)*(t2+1)*(d+1)}, without computing individual rating values.

FIGS. 11 to 14 illustrate examples of keyword rating results in Embodiment 1. FIGS. 11 and 12 illustrate example keyword rating results for the case where a mobile apparatus 10 requested seasonal information regarding the area near Akashi City, Hyogo Prefecture, Japan on Apr. 7, 2009 at 13:00. FIGS. 13 and 14 illustrate example keyword rating results for the case where a mobile apparatus 10 requested seasonal information regarding the area near Akashi City, Hyogo Prefecture, Japan on Dec. 24, 2009 at 21:00.

In the example illustrated in FIG. 11, the location of the mobile apparatus 10 is Akashi City, Hyogo Prefecture, and thus information is extracted from a certain number of submissions that were submitted near Akashi City, Hyogo Prefecture. For example, the certain number of submissions may be 12. Subsequently, for each set of extracted information, the information providing apparatus 40 computes a rating value Et1 for the relative date, a rating value Et2 for the relative time, and a rating value Ed for the relative distance. The information providing apparatus 40 then takes the product of the individual rating values to compute a final rating value E.

FIG. 12 illustrates information sorted in order of descending rating values E. The top-rated keyword is "Akashi Park, flower viewing", transmitted on April 8 at 12:50. This keyword is closest to the request for information regarding the area near Akashi City that was issued on April 7 at 13:00. As a result, the information providing apparatus 40 searches via the search server 30 for Internet Web pages related to "Akashi Park, flower viewing" in order to provide optimal information for the user. The information providing apparatus 40 then provides the information obtained as search results to the mobile apparatus 10.

FIG. 13 is similar to the above. The location of the mobile apparatus 10 is Akashi City, Hyogo Prefecture, and thus information is extracted from a certain number of submissions that were submitted near Akashi City, Hyogo Prefecture. Subsequently, for each set of extracted information, the information providing apparatus 40 computes a rating value Et1 for the relative date, a rating value Et2 for the relative time, and a rating value Ed for the relative distance. The information providing apparatus 40 then takes the product of the individual rating values to compute a final rating value E.

FIG. 14 illustrates information sorted in order of descending rating values E. The top-rated keyword is "Akashi Kaikyo Bridge, light up", transmitted on December 24 at 20:55. This keyword is closest to the request for information regarding the area near Akashi City that was issued on December 24 at 21:00. As a result, the information providing apparatus 40 searches via the search server 30 for Internet Web pages related to "Akashi Kaikyo Bridge, light up" in order to provide optimal information for the user. The information providing apparatus 40 then provides the information obtained as search results to the mobile apparatus 10.

After conducting weighted rating of the individual keywords in S27, the information providing apparatus 40 extracts a fixed number of the top-ranked keywords from among keywords whose rating values equal or exceed a threshold value (S28). Subsequently, the information providing apparatus 40 determines whether or not any keywords have been extracted (S29). If no keywords have been extracted (S29: NO), then the information providing apparatus 40 returns the process to S21. At this point, a notification may also be issued to the information recipient (e.g., the mobile apparatus 10) indicating that there exists no information to be provided.

If keywords have been extracted (S29: YES), then the information providing apparatus 40 issues a search request by sending the one or more extracted keywords to the search server 30 as search keywords (S30). Subsequently, the information providing apparatus 40 determines whether or not search results in the form of one or more URLs have been received from the search server 30 (S31). If one or more URLs have been received (S31: YES), then the information providing apparatus 40 provides information regarding the one or more received URLs to the information recipient (e.g., the mobile apparatus 10) (S32). In cases of plural search results, the information providing apparatus 40 provides a fixed number of URLs to the information recipient.

In the case where one or more search result URLs for a given keyword are provided to the information recipient (S32), or in the case where no URLs are received in S31 (S31: NO), the information providing apparatus 40 determines whether or not search requests have been issued for all keywords extracted in S28 (S33). If it is determined that there exist one or more keywords for which a search request has not been issued (S33: NO), then the process returns to S30. In contrast, if it is determined that search requests have been issued for all keywords (S33: YES), then the process returns to S21.

Figure 15:
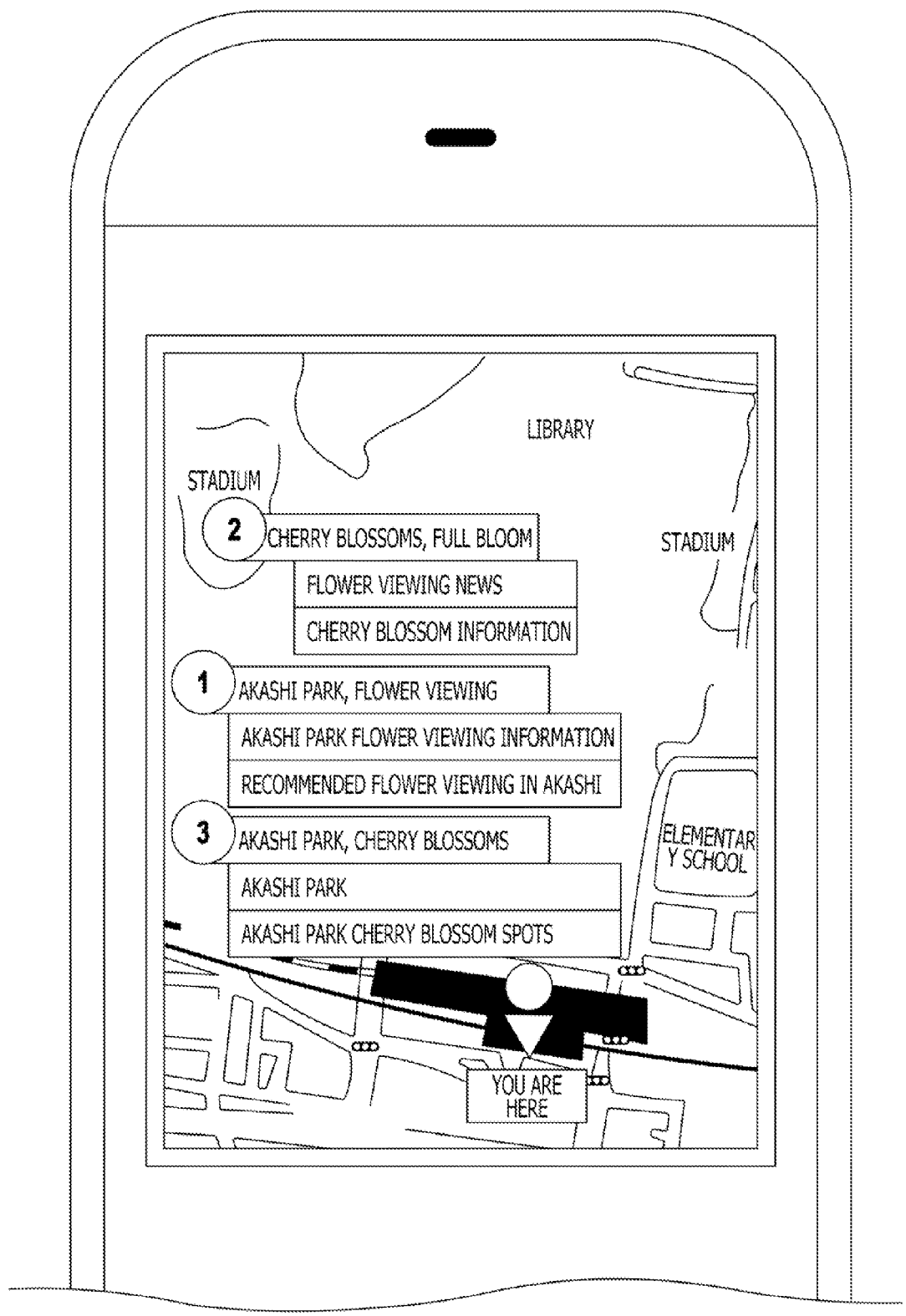
FIG. 15 schematically illustrates an example display shown on a mobile apparatus.

FIG. 15 schematically illustrates an example display wherein information provided by the information providing apparatus 40 is displayed on a mobile apparatus 10. FIG. 15 illustrates an example screen displaying two results per keyword on a map of the area near the device's current position. The two results displayed are information content related to keywords whose rating values are among the top three ranked, and whose rating values are at least 0.0001.

On the screen, the keyword with the top-ranked rating value is "Akashi Park, flower viewing". The information providing apparatus 40 has performed searches using the search keywords "Akashi Park" and "flower viewing". As a result, the mobile apparatus 10 displays the titles of the content obtained as search results: "Akashi Park Flower Viewing Information" and "Recommended Flower Viewing in Akashi". Each search result is represented as a hyperlink to the corresponding content. Such content may be subsequently displayed on the mobile apparatus 10 as a result of the user performing a selection operation.

The 2nd ranked keyword "cherry blossoms, full bloom" and the 3rd ranked keyword "Akashi Park, cherry blossoms" are similar. The content titles "Flower Viewing News" and "Cherry Blossom Information" are displayed as the search results for the 2nd ranked keyword "cherry blossoms, full bloom". Additionally, the content titles "Akashi Park" and "Akashi Park Cherry Blossom Spots" are displayed as the search results for the 3rd ranked keyword "Akashi Park, cherry blossoms".

As a result of the above, information that was transmitted near the user at the closest dates and times is extracted as the optimal information for the user. Keywords extracted from this transmitted information are then used as search keywords to extract Web pages published on the Internet. In so doing, it becomes possible to provide optimal information for the user.

Embodiment 2

Embodiment 1 is configured such that, when transmitted information managed by the transmitted information management apparatus 20 is acquired from a mobile apparatus 10, position information (e.g., latitude and longitude values) as well as time information that has been obtained by the mobile apparatus 10 is received and stored in the transmitted information database 23. However, in cases where the data contained in the transmitted information is place and date and time information, an embodiment may be configured to extract the place and date and time information from the transmitted information, and then store the extracted information in the transmitted information database 23.

In Embodiment 2, a configuration will be described wherein a submission is received containing image data with Exif information (Exif: Exchangeable image file format), and wherein information regarding the shooting location as well as the shooting date and time is extracted from the submitted image data and managed.

In Embodiment 2, the user-transmitted information is image data shot by a digital camera or similar apparatus, as well as comments created with respect to the image data. The transmitted information management apparatus 20 stores transmitted information acquired from a mobile apparatus 10 or similar apparatus in the transmitted information database 23. The transmitted information management apparatus 20 then manages images shot in a variety of places at a variety of dates and times, as well as the information corresponding to such images. The transmitted information management apparatus 20 may be an image uploading site, a mobile phone SNS system capable of handling images, or a mobile phone email system capable of handling images, for example.

FIG. 16 conceptually illustrates one example of the content stored in the transmitted information database 23. The transmitted information database 23 contains image data and comments. The image data is data for images that have been shot by users in a variety of places at a variety of dates and times. The image data may be image files in JPEG format, for example. The comments are comments related to the image data. In the example illustrated in FIG. 16, respective image data file names and the text of corresponding comments are stored in association with each other.

The information providing apparatus 40 sends an information reference request to the transmitted information management apparatus 20. Subsequently, the information providing apparatus 40 acquires transmitted information, and from the shooting information for the acquired image data (e.g., the Exif information), extracts the following: the shooting date, the shooting time, the shooting latitude, and the shooting longitude. Additionally, the information providing apparatus 40 extracts keywords from the comments, while also associating together and storing the comments and the image data in the keyword database 47. At this point, the keywords may be extracted by selecting and using just the nouns obtained from word groups obtained by conducting Japanese morphological analysis with respect to the text in the transmitted information.

FIG. 17 illustrates associations between respective submitted images, shooting dates and times, and shooting locations. By referencing the Exif information contained in the image data of a submitted image data file, the information providing apparatus 40 acquires information regarding the shooting date and time, the shooting latitude, and the shooting longitude. The information providing apparatus 40 then associates together and registers the following in a keyword database: the keywords extracted from the comments, the shooting date and time, the shooting latitude, and the shooting longitude. As a result of the above process, a keyword database 47 similar to that of Embodiment 1 is obtained. At this point, the shooting date and time are managed in the keyword database 47 as the transmission date and the transmission time of the transmitted information, while the shooting latitude and the shooting longitude are managed as the transmission latitude and the transmission longitude, respectively.

Figure 18:
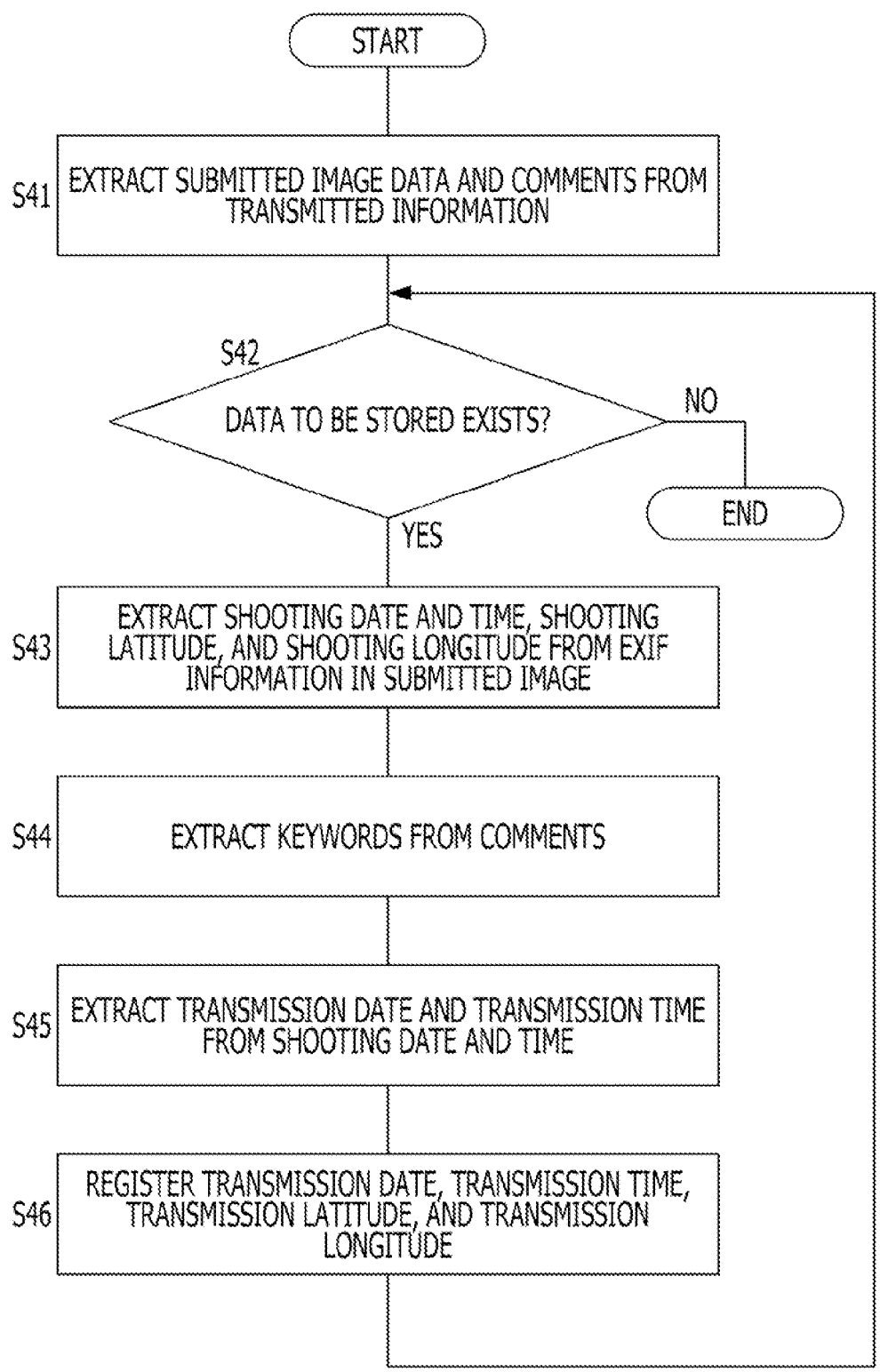
FIG. 18 is a flowchart explaining the operation of a keyword registration process executed by an information providing apparatus.

FIG. 18 is a flowchart explaining the steps of a keyword registration process executed by the information providing apparatus 40. The information providing apparatus 40 acquires transmitted information registered in the transmitted information database 23 of the transmitted information management apparatus 20. Subsequently, the information providing apparatus 40 extracts submitted image data and comments contained in the transmitted information (S41).

The information providing apparatus 40 determines whether or not there exists data to be stored in the keyword database 47 (S42). If data to be stored does exist (S42: YES), then the information providing apparatus 40 extracts the shooting date and time, the shooting latitude, and the shooting longitude from the Exif information of the submitted image (S43). In addition, the information providing apparatus 40 also extracts keywords in the form of nouns contained in the comments, similarly to Embodiment 1 (S44). If it is determined in S42 that data to be stored does not exist (S42: NO), then the keyword registration process is terminated.

From the shooting date and time, the information providing apparatus 40 extracts the transmission date and the transmission time of the information (S45). In the present embodiment, the shooting date and time obtained from the Exif information is treated as the transmission date and the transmission time, regardless of the date and time when the submitted image was transmitted.

Subsequently, the information providing apparatus 40 stores the extracted transmission date, transmission time, transmission latitude, transmission longitude, and keywords in the keyword database 47 (S46).

Embodiment 3

In Embodiment 1, the information providing apparatus 40 is configured to rate transmitted information according to the proximity of its transmission location and transmission date and time with respect to the location and date and time of the mobile apparatus 10 attempting acquire information. However, in cases where the keywords are proper nouns, it is expected that such keywords will be more characteristic of the information than other keywords. In other words, it is also possible to configure an embodiment to conduct weighted rating according to the number of proper nouns contained in the keywords.

In Embodiment 3, a configuration will be described wherein weighted rating is conducted according to the number of proper nouns contained in the keywords.

When extracting keywords from transmitted information, the information providing apparatus 40 counts the number of proper nouns contained in the keywords. For this purpose, the information providing apparatus 40 includes a proper noun dictionary in which proper nouns to be counted are registered. The information providing apparatus 40 then determines whether or not the nouns extracted as keywords are registered in the proper noun dictionary. Subsequently, the information providing apparatus 40 counts the number of nouns determined to be registered in the proper noun dictionary, and takes this number to be the number of proper nouns.

The information providing apparatus 40 then associates together and stores the transmission date, transmission time, transmission latitude, transmission longitude, keywords, and proper noun count in the keyword database 47.

FIG. 19 conceptually illustrates one example of the content stored in the keyword database 47. The keyword database 47 manages keywords contained in information transmitted by users from a variety of locations at a variety of dates and times. In the keyword database 47, the following information, having been extracted from transmitted information, is respectively stored in association with each other: transmission dates, transmission times, transmission latitudes, transmission longitudes, keywords, and counts of proper nouns contained in the keywords.

Figure 20:
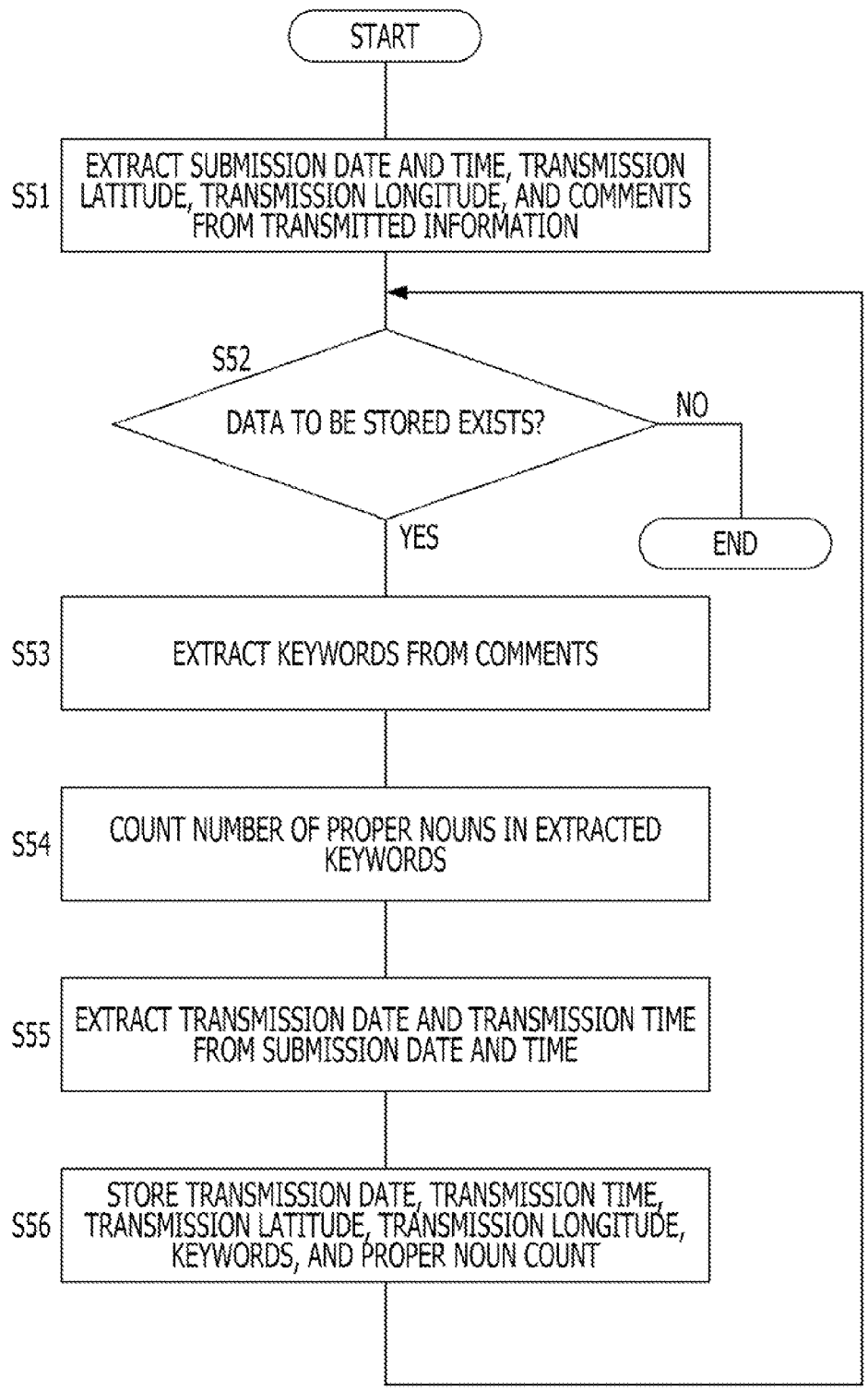
FIG. 20 is a flowchart explaining the operation of a keyword registration process executed by an information providing apparatus.

FIG. 20 is a flowchart explaining the steps of a keyword registration process executed by the information providing apparatus 40. The information providing apparatus 40 acquires transmitted information registered in the transmitted information database 23 of the transmitted information management apparatus 20. Subsequently, the information providing apparatus 40 extracts the submission date and time, transmission latitude, transmission longitude, and comments contained in the transmitted information (S51).

The information providing apparatus 40 determines whether or not there exists data to be stored in the keyword database 47 (S52). If it is determined that data to be stored does not exist (S52: NO), then the keyword registration process is terminated.

If data to be stored does exist (S52: YES), then nouns contained in the comments are extracted as keywords (S53). In addition, the information providing apparatus 40 also counts the number of proper nouns in the extracted keywords (S54).

Furthermore, the information providing apparatus 40 extracts the transmission date and the transmission time of the information from the submission date and time contained in the transmitted information (S55).

The information providing apparatus 40 then stores the extracted transmission date, transmission time, transmission latitude, transmission longitude, keywords, and proper noun count in the keyword database 47 (S56).

Figure 21:
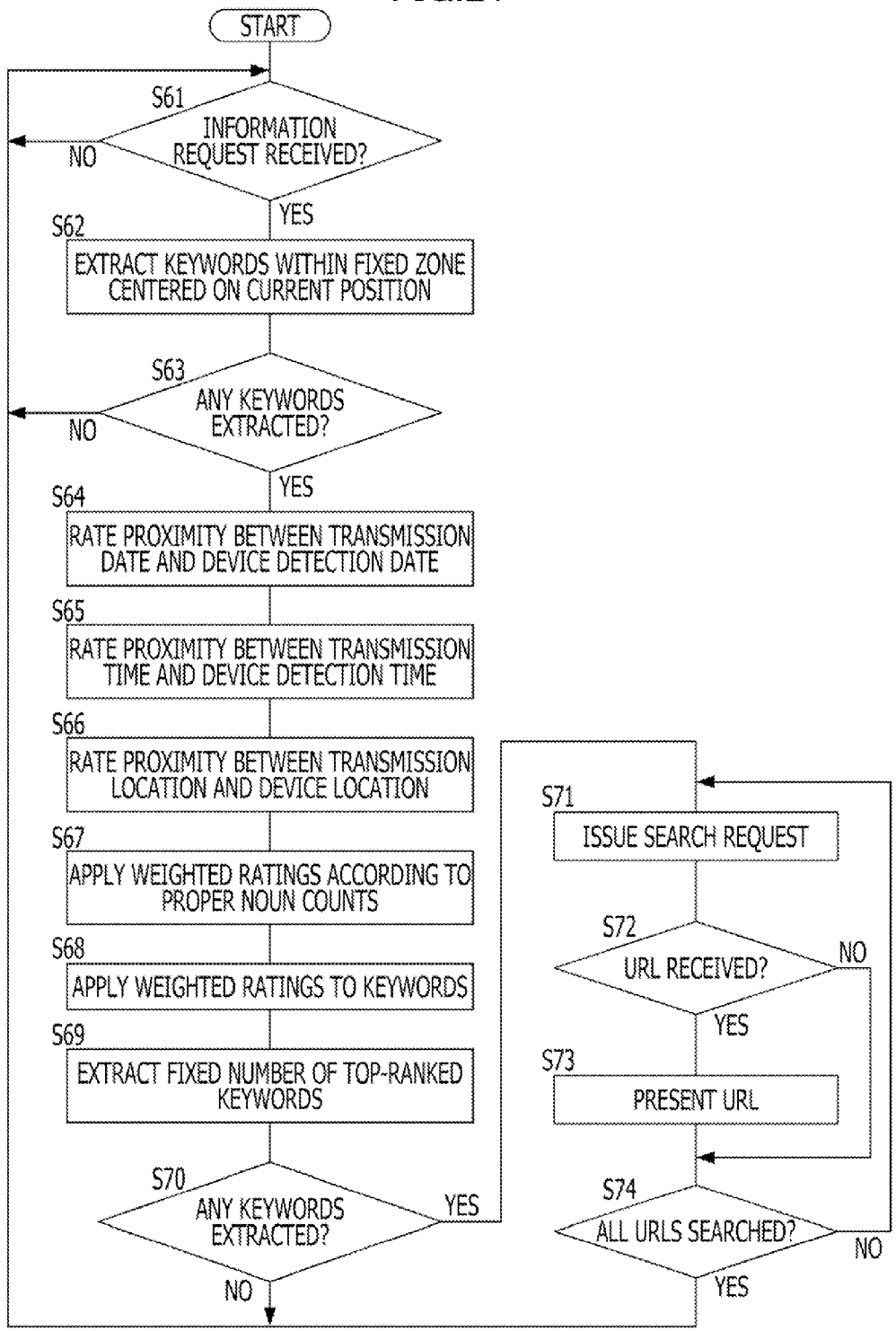
FIG. 21 is a flowchart explaining the operation of an information providing process executed by an information providing apparatus.

An information providing process executed by the information providing apparatus 40 will now be described. FIG. 21 is a flowchart explaining the steps of an information providing process executed by the information providing apparatus 40. The information providing apparatus 40 determines whether or not an information request has been received from a mobile apparatus 10 (S61). If it is determined that an information request has not been received (S61: NO), then the process returns to S61, and the information providing apparatus 40 stands by until an information request is received.

If it is determined that an information request has been received (S61: YES), then the information providing apparatus 40 references the keyword database 47 and extracts keywords corresponding to positions within a fixed zone centered on the current position (e.g., location) of the mobile apparatus 10 (S62).

Subsequently, the information providing apparatus 40 determines whether or not any keywords have been extracted from the keyword database 47 (S63). If no relevant keywords have been extracted (S63: NO), then the information providing apparatus 40 returns the process to S61.

If keywords have been extracted (S63: YES), then the information providing apparatus 40 rates each keyword similarly as in Embodiment 1. More specifically, for each extracted keyword, the information providing apparatus 40 respectively rates the proximity between the transmission date and the detection date of the mobile apparatus 10, the proximity between transmission time and the detection time of the mobile apparatus 10, as well as the proximity between the transmission location and the location of the mobile apparatus 10 (S64 to S66). In other words, the information providing apparatus 40 computes the rating adjustment ratios Et1 (%), Et2 (%), and Ed (%).

Subsequently, the information providing apparatus 40 conducts weighted rating according to the number of proper nouns (S67). One example of a rating formula is given by the rating adjustment ratio Ep (%), and computed according to Ep=p, where p is the number of proper nouns contained in the keywords. This rating adjustment ratio Ep is proportional to the number of proper nouns, with Ep becoming 0% when there are 0 proper nouns, 100% when there is 1 proper noun, and increasing as the number of proper nouns increases.

Subsequently, the information providing apparatus 40 conducts weighted rating of each extracted keyword (S68). The weighted rating E is the product of Et1, Et2, Ed, and Ep computed in S64 to S67, and computed according to Et1*Et2*Ed*Ep.

FIGS. 22 to 25 illustrate examples of keyword rating results in Embodiment 3. FIGS. 22 and 23 illustrate example keyword rating results for the case where a mobile apparatus 10 requested seasonal information regarding the area near Akashi City, Hyogo Prefecture, Japan on Apr. 7, 2009 at 13:00. FIGS. 24 and 25 illustrate example keyword rating results for the case where a mobile apparatus 10 requested seasonal information regarding the area near Akashi City, Hyogo Prefecture, Japan on Dec. 24, 2009 at 21:00.

FIG. 23 illustrates results similar to those of Embodiment 1. The top-rated keyword is "Akashi Park, flower viewing", transmitted on April 8 at 12:50. This keyword is closest to the request for information regarding the area near Akashi City that was issued on April 7 at 13:00. The 2nd ranked keyword that was picked up is "Akashi Park, cherry blossoms", which contains a proper noun.

Meanwhile, the order of the rating results illustrated in FIG. 25 is similar to that of Embodiment 1.

After conducting weighted rating of the individual keywords in S68, the information providing apparatus 40 extracts a fixed number of the top-ranked keywords from among keywords whose rating values equal or exceed a threshold value (S69). Subsequently, the information providing apparatus 40 determines whether or not any keywords have been extracted (S70). If no keywords have been extracted (S70: NO), then the information providing apparatus 40 returns the process to S61. At this point, a notification may also be issued to the information recipient (e.g., the mobile apparatus 10) indicating that there exists no information to be provided.

If keywords have been extracted (S70: YES), then the information providing apparatus 40 issues a search request (S71). In other words, the information providing apparatus 40 sends the one or more extracted keywords to the search server 30 as search keywords. Subsequently, the information providing apparatus 40 determines whether or not search results in the form of one or more URLs have been received from the search server 30 (S72). If one or more URLs have been received (S72: YES), then the information providing apparatus 40 provides information regarding the one or more received URLs to the information recipient (e.g., the mobile apparatus 10) (S73). In cases of plural search results, the information providing apparatus 40 provides a fixed number of URLs to the information recipient.

In the case where one or more search result URLs for a given keyword are provided to the information recipient (S73), or in the case where no relevant URLs exist (S72: NO), the information providing apparatus 40 determines whether or not search requests have been issued for all keywords extracted in S69 (S74). If it is determined that there exist one or more keywords for which a search request has not been issued (S74: NO), then the process returns to S71. In contrast, if it is determined that search requests have been issued for all keywords (S74: YES), then the process returns to S61.

In the present embodiment, the rating increases for keywords containing proper nouns, such as place names or landmarks. In other words, there is an increased probability that keywords containing proper nouns such as place names or landmarks will be selected as search keywords. As a result, it becomes possible to search for and provide information that is suited to the location of the information recipient.

It should also be appreciated that the foregoing Embodiments 1 to 3 may also be configured such that the functions of the transmitted information management apparatus 20 are included in the information providing apparatus 40, and such that information transmitted from users is managed by the information providing apparatus 40.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

The invention claimed is:

1. An information providing apparatus comprising:
a memory; and
a processor coupled to the memory, the processor configured to
receive transmitted information containing first location information associated with a first communication apparatus,
extract, from the transmitted information, one or more keywords expressing a characteristic of the transmitted information and the first location information, and register the first location information and the extracted one or more keywords associated with the first location information in a keyword database,
receive a request for information from a second communication apparatus and second location information associated with the second communication apparatus,
reference the keyword database and obtain one or more keywords based on the second location information, and
output a search request containing the obtained one or more keywords associated with the second location information, wherein the search request is output to another computer that executes an Internet search based on the obtained one or more keywords to provide information to the second communication apparatus.

2. The information providing apparatus according to claim 1, wherein
the processor receives search results in response to the search request from the another computer, generates information to provide to the second communication apparatus based on the search results, and sends the generated information to the second communication apparatus.

3. The information providing apparatus according to claim 1, wherein
the processor obtains the one or more keywords associated with the first location information that indicates locations within a range extending from a location indicated by the second location information.

4. The information providing apparatus according to claim 1, wherein the processor is further configured to perform rating of a proximity between the second location information and the first location information stored in the keyword database, and
the processor obtains the one or more keywords based on the rating results.

5. The information providing apparatus according to claim 1, wherein the processor is further configured to reference the keyword database, and to weight keywords based on a number of proper nouns contained in a plurality of keywords associated with the first location information, and
the processor obtains the one or more keywords based on the weight.

6. The information providing apparatus according to claim 1, wherein
the processor additionally obtains the first location information corresponding to the obtained one or more keywords in the keyword database, and
outputs a search request additionally containing the first location information.

7. The information providing apparatus according to claim 1, wherein
the processor additionally obtains the first location information corresponding to the obtained one or more keywords in the keyword database, and
based on the obtained first location information, acquires the names of landmarks existing in locations equivalent to the obtained first location information, and outputs a search request additionally containing the acquired names.

8. The information providing apparatus according to claim 1, wherein
the transmitted information contains comment information related to the location indicated by the first location information, and
the processor extracts nouns from the comment information contained in the transmitted information, and registers the extracted nouns as the one or more keywords in the keyword database.

9. The information providing apparatus according to claim 1, wherein
the first location information is information regarding a location of the first communication apparatus, and
the second location information is information regarding a location of the second communication apparatus.

10. The information providing apparatus according to claim 1, wherein
the processor additionally specifies first date and time information associated with the transmitted information and registers the first date and time information in the keyword database, and
specifies second date and time information associated with the request, references the keyword database, and obtains the one or more keywords based on the second location information and the second date and time information.

11. The information providing apparatus according to claim 10, wherein
the processor obtains the one or more keywords associated with the first location information that indicates locations within a range extending from a location indicated by the second location information, and
the first date and time information that indicates times within a range extending from the date and time indicated by the second date and time information.

12. The information providing apparatus according to claim 10, wherein
the processor is further configured to reference the keyword database, and rate a proximity between the second location information and the first location information, and a proximity between the second date and time information and the first date and time information, and
the processor obtains the one or more keywords based on rating results.

13. The information providing apparatus according to claim 10, wherein the processor is further configured to reference the keyword database, and weight keywords based on a number of proper nouns contained in a plurality of keywords associated with the first location information, and
the processor obtains the one or more keywords based on the weight.

14. The information providing apparatus according to claim 10, wherein
the processor additionally obtains the first location information corresponding to the obtained one or more keywords in the keyword database, and
outputs a search request additionally containing the first location information.

15. The information providing apparatus according to claim 10, wherein
the processor additionally obtains the first location information corresponding to the obtained one or more keywords in the keyword database, and
based on the obtained first location information, acquires a name of landmarks existing in locations equivalent to the obtained first location information, and outputs a search request additionally containing the acquired names.

16. The information providing apparatus according to claim 10, wherein
the first date and time information is information regarding the date and time when the transmitted information was received from the first communication apparatus, and
the second date and time information is information regarding the date and time when the request was received from the second communication apparatus.

17. An information providing method comprising:
receiving transmitted information containing first location information associated with a first communication apparatus;
extracting, from the transmitted information, one or more keywords expressing a characteristic of the transmitted information and the first location information;
registering the first location information and the extracted one or more extracted keywords associated with the first location information in a keyword database;
receiving a request for information from a second communication apparatus and a second location information associated with the second communication apparatus;
referencing the keyword database and obtaining one or more keywords based on the second location information; and
outputting, with a computer, a search request containing the obtained one or more extracted keywords associated with the second location information, wherein the search request is output to another computer that executes a search based on the obtained one or more keywords to provide information to the second communication apparatus.

18. The information providing method according to claim 17, further comprising:
specifying first date and time information associated with the transmitted information;
additionally registering the specified first date and time information in the keyword database;
specifying second date and time information associated with the request; and
referencing the keyword database and obtaining one or more keywords based on the second location information and the second date and time information.

19. A memory medium storing an information providing program causing a computer to perform:
receiving transmitted information containing first location information associated with a first communication apparatus;
extracting, from the transmitted information, one or more keywords expressing a characteristic of the transmitted information and the first location information;
registering the first location information and the one or more extracted keywords associated with the first location information in a keyword database;
receiving a request for information from a second communication apparatus and a second location information associated with the second communication apparatus;
referencing the keyword database and obtaining one or more keywords based on the second location information; and
outputting a search request containing the obtained one or more extracted keywords associated with the second location information, wherein the search request is output to another computer that executes a search based on the obtained one or more keywords to provide information to the second communication apparatus.

20. The memory medium according to claim 19, further comprising:
specifying first date and time information associated with the transmitted information;
additionally registering the specified first date and time information in the keyword database;
specifying second date and time information associated with the request; and
referencing the keyword database and obtaining one or more keywords based the second location information and the second date and time information.

* * * * *